(12) United States Patent
Dal Mutto et al.

(10) Patent No.: US 9,507,417 B2
(45) Date of Patent: Nov. 29, 2016

(54) SYSTEMS AND METHODS FOR IMPLEMENTING HEAD TRACKING BASED GRAPHICAL USER INTERFACES (GUI) THAT INCORPORATE GESTURE REACTIVE INTERFACE OBJECTS

(71) Applicant: Aquifi, Inc., Palo Alto, CA (US)

(72) Inventors: Carlo Dal Mutto, Sunnyvale, CA (US); Giulio Marin, Mountain View, CA (US); Abbas Rafii, Palo Alto, CA (US); Tony Zuccarino, Saratoga, CA (US)

(73) Assignee: Aquifi, Inc., Palo Alto, CA (US)

( * ) Notice: Subject to any disclaimer, the term of this patent is extended or adjusted under 35 U.S.C. 154(b) by 85 days.

(21) Appl. No.: 14/591,813

(22) Filed: Jan. 7, 2015

(65) Prior Publication Data

US 2015/0192991 A1  Jul. 9, 2015

Related U.S. Application Data

(60) Provisional application No. 61/924,686, filed on Jan. 7, 2014.

(51) Int. Cl.
*G06F 3/00* (2006.01)
*G06F 3/01* (2006.01)
*G06F 3/0482* (2013.01)

(52) U.S. Cl.
CPC .......... *G06F 3/012* (2013.01); *G06F 3/0482* (2013.01)

(58) Field of Classification Search
CPC ..... G06F 3/012; G06F 3/0482; G06F 3/0481
See application file for complete search history.

(56) References Cited

U.S. PATENT DOCUMENTS

| 5,454,043 | A |   | 9/1995  | Freeman    |            |
|-----------|---|---|---------|------------|------------|
| 5,852,672 | A |   | 12/1998 | Lu         |            |
| 5,886,683 | A | * | 3/1999  | Tognazzini | G06F 3/013 |
|           |   |   |         |            | 345/156    |

(Continued)

FOREIGN PATENT DOCUMENTS

| WO | 9749262    | A1 | 12/1997 |
|----|------------|----|---------|
| WO | 2005091125 | A2 | 9/2005  |

(Continued)

OTHER PUBLICATIONS

International Search Report and Written Opinion for International Application PCT/US2014/012748, report completed Nov. 30, 2014, Mailed Jan. 14, 2015, 17 Pgs.

(Continued)

*Primary Examiner* — Omar Abdul-Ali

(74) *Attorney, Agent, or Firm* — Lewis Roca Rothgerber Christie LLP

(57) ABSTRACT

Embodiments in accordance with this invention disclose systems and methods for implementing head tracking based graphical user interfaces that incorporate gesture reactive interface objects. The disclosed embodiments perform a method in which a GUI includes interface objects is rendered and displayed. Image data of an interaction zone is captured. A targeting gestured targeting a targeted interface object is detected in the captured image data and a set of 3D head interaction gestures are enabled. Additional image data is captured. Motion of at least a portion of a human head is detected and one of the 3D head interactions is identified. The rendering of the interface is modified in response to the detection of one of the 3D head interactions and the modified interface is displayed.

1 Claim, 22 Drawing Sheets

(56) References Cited

U.S. PATENT DOCUMENTS

| | | |
|---|---|---|
| 6,191,773 B1 | 2/2001 | Maruno et al. |
| 6,323,942 B1 | 11/2001 | Bamji |
| 6,512,838 B1 | 1/2003 | Rafii et al. |
| 6,515,740 B2 | 2/2003 | Bamji et al. |
| 6,522,395 B1 | 2/2003 | Bamji et al. |
| 6,580,496 B2 | 6/2003 | Bamji et al. |
| 6,587,186 B2 | 7/2003 | Bamji et al. |
| 6,614,422 B1 | 9/2003 | Rafii |
| 6,674,895 B2 | 1/2004 | Rafii et al. |
| 6,678,039 B2 | 1/2004 | Charbon |
| 6,690,354 B2 | 2/2004 | Sze |
| 6,690,618 B2 | 2/2004 | Tomasi et al. |
| 6,710,770 B2 | 3/2004 | Tomasi et al. |
| 6,834,120 B1 | 12/2004 | LeClerc et al. |
| 6,876,775 B2 | 4/2005 | Torunoglu |
| 6,906,793 B2 | 6/2005 | Bamji et al. |
| 6,919,549 B2 | 7/2005 | Bamji et al. |
| 6,944,315 B1 | 9/2005 | Zipperer et al. |
| 7,006,236 B2 | 2/2006 | Tomasi et al. |
| 7,038,659 B2 | 5/2006 | Rajkowski |
| 7,050,177 B2 | 5/2006 | Tomasi et al. |
| 7,151,530 B2 | 12/2006 | Roeber et al. |
| 7,157,685 B2 | 1/2007 | Bamji et al. |
| 7,173,230 B2 | 2/2007 | Charbon |
| 7,176,438 B2 | 2/2007 | Bamji et al. |
| 7,203,356 B2 | 4/2007 | Gokturk et al. |
| 7,212,663 B2 | 5/2007 | Tomasi |
| 7,283,213 B2 | 10/2007 | O'Connor et al. |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 7,433,029 B1 | 10/2008 | Hsu |
| 7,450,220 B2 | 11/2008 | O'Connor et al. |
| 7,464,351 B2 | 12/2008 | Bamji et al. |
| 7,471,376 B2 | 12/2008 | Bamji et al. |
| 7,507,947 B2 | 3/2009 | Bamji et al. |
| 7,511,801 B1 | 3/2009 | Rafii et al. |
| 7,526,120 B2 | 4/2009 | Gokturk et al. |
| 7,636,150 B1 | 12/2009 | McCauley et al. |
| 7,653,833 B1 | 1/2010 | Miller et al. |
| 7,653,883 B2 | 1/2010 | Hotelling et al. |
| 7,665,041 B2 | 2/2010 | Wilson et al. |
| 7,719,662 B2 | 5/2010 | Bamji et al. |
| 7,741,961 B1 | 6/2010 | Rafii et al. |
| 7,791,715 B1 | 9/2010 | Bamji |
| 7,805,003 B1 | 9/2010 | Cohen et al. |
| 7,877,707 B2 | 1/2011 | Westerman et al. |
| 7,936,449 B1 | 5/2011 | Bamji et al. |
| 7,994,465 B1 | 8/2011 | Bamji et al. |
| 8,009,871 B2 | 8/2011 | Rafii et al. |
| D645,493 S | 9/2011 | Zhao |
| 8,086,971 B2 | 12/2011 | Radivojevic et al. |
| 8,134,637 B2 | 3/2012 | Rossbach |
| 8,139,141 B2 | 3/2012 | Bamji et al. |
| 8,139,142 B2 | 3/2012 | Bamji et al. |
| 8,179,604 B1 | 5/2012 | Prada Gomez et al. |
| 8,180,114 B2 | 5/2012 | Nishihara et al. |
| 8,187,097 B1 | 5/2012 | Zhang |
| 8,194,233 B2 | 6/2012 | Bamji |
| 8,203,699 B2 | 6/2012 | Bamji et al. |
| 8,212,859 B2 | 7/2012 | Tang et al. |
| 8,232,990 B2 | 7/2012 | King et al. |
| 8,253,705 B2* | 8/2012 | Vuong ............... G06F 3/0482 345/173 |
| 8,265,350 B2 | 9/2012 | Torii et al. |
| 8,274,535 B2 | 9/2012 | Hildreth et al. |
| 8,314,924 B2 | 11/2012 | Bamji et al. |
| 8,339,359 B2 | 12/2012 | Hsieh et al. |
| 8,363,212 B2 | 1/2013 | Bamji et al. |
| 8,368,795 B2 | 2/2013 | Lo et al. |
| 8,462,132 B2 | 6/2013 | Ren et al. |
| 8,525,876 B2 | 9/2013 | Fan et al. |
| 8,539,359 B2 | 9/2013 | Rapaport et al. |
| 8,587,773 B2 | 11/2013 | Bamji et al. |
| 8,589,033 B2 | 11/2013 | Rafii et al. |
| 8,602,887 B2 | 12/2013 | Tardif et al. |
| 8,615,108 B1 | 12/2013 | Stoppa et al. |
| 8,655,021 B2 | 2/2014 | Dal Mutto et al. |
| 8,675,182 B2 | 3/2014 | Bamji |
| 8,681,124 B2 | 3/2014 | Bamji et al. |
| 8,686,943 B1 | 4/2014 | Rafii |
| 8,693,724 B2 | 4/2014 | Ahmed et al. |
| 8,773,512 B1 | 7/2014 | Rafii |
| 8,787,663 B2 | 7/2014 | Litvak et al. |
| 8,824,737 B2 | 9/2014 | Gurman et al. |
| 8,830,312 B2 | 9/2014 | Hummel et al. |
| 8,836,768 B1 | 9/2014 | Rafii et al. |
| 8,840,466 B2 | 9/2014 | Kareemi et al. |
| 8,854,433 B1 | 10/2014 | Rafii |
| 8,934,675 B2 | 1/2015 | Dal Mutto et al. |
| 2002/0112095 A1 | 8/2002 | Ford et al. |
| 2002/0140633 A1 | 10/2002 | Rafii et al. |
| 2003/0021032 A1 | 1/2003 | Bamji et al. |
| 2003/0132921 A1 | 7/2003 | Torunoglu et al. |
| 2003/0132950 A1 | 7/2003 | Surucu et al. |
| 2003/0165048 A1 | 9/2003 | Bamji et al. |
| 2003/0169906 A1 | 9/2003 | Gokturk et al. |
| 2003/0169907 A1* | 9/2003 | Edwards ............ G06K 9/00248 382/118 |
| 2003/0172375 A1 | 9/2003 | Shaw et al. |
| 2003/0174125 A1 | 9/2003 | Torunoglu et al. |
| 2004/0046744 A1 | 3/2004 | Rafii et al. |
| 2004/0066500 A1 | 4/2004 | Gokturk et al. |
| 2004/0170323 A1 | 9/2004 | Cootes et al. |
| 2005/0134853 A1 | 6/2005 | Ingleson et al. |
| 2005/0238229 A1 | 10/2005 | Ishidera |
| 2005/0271279 A1 | 12/2005 | Fujimura et al. |
| 2006/0187214 A1 | 8/2006 | Gillespie et al. |
| 2006/0197753 A1 | 9/2006 | Hotelling |
| 2006/0241371 A1 | 10/2006 | Rafii et al. |
| 2006/0272436 A1 | 12/2006 | Lein et al. |
| 2007/0057946 A1 | 3/2007 | Albeck et al. |
| 2007/0156295 A1* | 7/2007 | Stephane ............... G01C 23/00 701/1 |
| 2007/0299631 A1 | 12/2007 | Macbeth et al. |
| 2008/0059390 A1 | 3/2008 | Cox et al. |
| 2008/0120577 A1 | 5/2008 | Ma et al. |
| 2008/0281523 A1 | 11/2008 | Dahl et al. |
| 2009/0021489 A1 | 1/2009 | Westerman et al. |
| 2009/0077161 A1 | 3/2009 | Hamilton, II et al. |
| 2009/0079813 A1* | 3/2009 | Hildreth ............... H04N 7/147 348/14.03 |
| 2009/0103780 A1 | 4/2009 | Nishihara et al. |
| 2009/0110301 A1 | 4/2009 | Schopp et al. |
| 2009/0153671 A1 | 6/2009 | Lee et al. |
| 2009/0169907 A1* | 7/2009 | Stadlbauer .......... B29C 47/0021 428/523 |
| 2009/0183125 A1 | 7/2009 | Magal et al. |
| 2009/0290811 A1 | 11/2009 | Imai |
| 2009/0307658 A1 | 12/2009 | Freitas et al. |
| 2010/0027845 A1 | 2/2010 | Kim et al. |
| 2010/0027846 A1 | 2/2010 | Xu et al. |
| 2010/0027892 A1 | 2/2010 | Guan et al. |
| 2010/0053151 A1 | 3/2010 | Marti et al. |
| 2010/0110384 A1 | 5/2010 | Maekawa |
| 2010/0124949 A1 | 5/2010 | Demuynck et al. |
| 2010/0156676 A1 | 6/2010 | Mooring et al. |
| 2010/0192109 A1 | 7/2010 | Westerman et al. |
| 2010/0199228 A1 | 8/2010 | Latta et al. |
| 2010/0202663 A1 | 8/2010 | Kim et al. |
| 2010/0208038 A1 | 8/2010 | Kutliroff et al. |
| 2010/0211920 A1 | 8/2010 | Westerman et al. |
| 2010/0229125 A1 | 9/2010 | Cha |
| 2010/0235786 A1 | 9/2010 | Maizels et al. |
| 2010/0265316 A1 | 10/2010 | Sali et al. |
| 2010/0271511 A1 | 10/2010 | Ma et al. |
| 2010/0284082 A1 | 11/2010 | Shpunt et al. |
| 2010/0296368 A1 | 11/2010 | Dahl et al. |

(56) References Cited

U.S. PATENT DOCUMENTS

| | | |
|---|---|---|
| 2010/0306714 A1 | 12/2010 | Latta et al. |
| 2010/0321389 A1 | 12/2010 | Gay et al. |
| 2010/0329511 A1 | 12/2010 | Yoon et al. |
| 2011/0025827 A1 | 2/2011 | Shpunt et al. |
| 2011/0052006 A1 | 3/2011 | Gurman et al. |
| 2011/0069389 A1 | 3/2011 | Shpunt |
| 2011/0075259 A1 | 3/2011 | Shpunt |
| 2011/0096954 A1 | 4/2011 | Dahl |
| 2011/0103448 A1 | 5/2011 | Dahl et al. |
| 2011/0114857 A1 | 5/2011 | Akerman et al. |
| 2011/0115892 A1 | 5/2011 | Fan et al. |
| 2011/0134036 A1 | 6/2011 | Suggs |
| 2011/0134114 A1 | 6/2011 | Rais et al. |
| 2011/0148798 A1 | 6/2011 | Dahl |
| 2011/0149044 A1 | 6/2011 | Snin |
| 2011/0158508 A1 | 6/2011 | Shpunt et al. |
| 2011/0164032 A1 | 7/2011 | Shadmi |
| 2011/0173574 A1 | 7/2011 | Clavin et al. |
| 2011/0187878 A1 | 8/2011 | Mor et al. |
| 2011/0188054 A1 | 8/2011 | Petronius et al. |
| 2011/0197161 A1 | 8/2011 | Mattingly et al. |
| 2011/0205421 A1 | 8/2011 | Shpunt et al. |
| 2011/0211044 A1 | 9/2011 | Shpunt et al. |
| 2011/0211073 A1 | 9/2011 | Foster |
| 2011/0211754 A1 | 9/2011 | Litvak et al. |
| 2011/0219340 A1 | 9/2011 | Pathangay et al. |
| 2011/0221974 A1 | 9/2011 | Stern et al. |
| 2011/0222726 A1 | 9/2011 | Ruan |
| 2011/0243380 A1 | 10/2011 | Forutanpour et al. |
| 2011/0254762 A1 | 10/2011 | Dahl et al. |
| 2011/0254765 A1 | 10/2011 | Brand |
| 2011/0262006 A1 | 10/2011 | Nakano |
| 2011/0267456 A1 | 11/2011 | Adermann |
| 2011/0274357 A1 | 11/2011 | Iwamoto et al. |
| 2011/0286673 A1 | 11/2011 | Givon et al. |
| 2011/0289455 A1 | 11/2011 | Reville et al. |
| 2011/0291925 A1 | 12/2011 | Israel et al. |
| 2011/0291926 A1 | 12/2011 | Gokturk et al. |
| 2011/0291988 A1 | 12/2011 | Bamji et al. |
| 2011/0292036 A1 | 12/2011 | Sali et al. |
| 2011/0292181 A1 | 12/2011 | Acharya et al. |
| 2011/0292370 A1 | 12/2011 | Hills et al. |
| 2011/0292380 A1 | 12/2011 | Bamji |
| 2011/0293137 A1 | 12/2011 | Gurman et al. |
| 2011/0294574 A1 | 12/2011 | Yamada et al. |
| 2011/0295562 A1 | 12/2011 | Mehta et al. |
| 2011/0296353 A1 | 12/2011 | Ahmed et al. |
| 2011/0298704 A1 | 12/2011 | Krah |
| 2011/0300929 A1 | 12/2011 | Tardif et al. |
| 2011/0310010 A1 | 12/2011 | Hoffnung et al. |
| 2011/0310125 A1 | 12/2011 | McEldowney et al. |
| 2012/0011454 A1 | 1/2012 | Droz et al. |
| 2012/0027252 A1 | 2/2012 | Liu et al. |
| 2012/0038986 A1 | 2/2012 | Pesach |
| 2012/0042150 A1 | 2/2012 | Saar |
| 2012/0042246 A1 | 2/2012 | Schwesinger et al. |
| 2012/0050488 A1 | 3/2012 | Cohen et al. |
| 2012/0051605 A1 | 3/2012 | Nagar et al. |
| 2012/0054690 A1* | 3/2012 | Lim ................. G06F 3/012 715/852 |
| 2012/0070070 A1 | 3/2012 | Litvak |
| 2012/0072939 A1 | 3/2012 | Crenshaw |
| 2012/0078614 A1 | 3/2012 | Galor et al. |
| 2012/0092304 A1 | 4/2012 | Katz |
| 2012/0099403 A1 | 4/2012 | Dahl et al. |
| 2012/0106792 A1 | 5/2012 | Kang et al. |
| 2012/0124604 A1 | 5/2012 | Small et al. |
| 2012/0140094 A1 | 6/2012 | Shpunt et al. |
| 2012/0140109 A1 | 6/2012 | Shpunt et al. |
| 2012/0169583 A1 | 7/2012 | Rippel et al. |
| 2012/0169671 A1 | 7/2012 | Yasutake |
| 2012/0169887 A1* | 7/2012 | Zhu ................. G06T 7/0046 348/207.1 |
| 2012/0176414 A1 | 7/2012 | Givon |
| 2012/0182464 A1 | 7/2012 | Shpunt et al. |
| 2012/0202569 A1 | 8/2012 | Maizels et al. |
| 2012/0204133 A1 | 8/2012 | Guendelman et al. |
| 2012/0204202 A1 | 8/2012 | Rowley et al. |
| 2012/0206339 A1 | 8/2012 | Dahl |
| 2012/0218183 A1 | 8/2012 | Givon et al. |
| 2012/0223882 A1 | 9/2012 | Galor et al. |
| 2012/0243374 A1 | 9/2012 | Dahl et al. |
| 2012/0249744 A1 | 10/2012 | Pesach et al. |
| 2012/0268364 A1 | 10/2012 | Minnen |
| 2012/0270653 A1 | 10/2012 | Kareemi et al. |
| 2012/0274550 A1 | 11/2012 | Campbell et al. |
| 2012/0274610 A1 | 11/2012 | Dahl |
| 2012/0281240 A1 | 11/2012 | Cohen et al. |
| 2012/0299820 A1 | 11/2012 | Dahl |
| 2012/0304067 A1 | 11/2012 | Han et al. |
| 2012/0306876 A1 | 12/2012 | Shotton et al. |
| 2012/0309532 A1 | 12/2012 | Ambrus et al. |
| 2012/0313848 A1 | 12/2012 | Galor et al. |
| 2012/0313900 A1 | 12/2012 | Dahl |
| 2012/0327125 A1 | 12/2012 | Kutliroff et al. |
| 2013/0014052 A1 | 1/2013 | Frey et al. |
| 2013/0038601 A1 | 2/2013 | Han et al. |
| 2013/0038881 A1 | 2/2013 | Pesach et al. |
| 2013/0038941 A1 | 2/2013 | Pesach et al. |
| 2013/0044053 A1 | 2/2013 | Galor et al. |
| 2013/0050080 A1 | 2/2013 | Dahl et al. |
| 2013/0055120 A1 | 2/2013 | Galor et al. |
| 2013/0055143 A1* | 2/2013 | Martin ................. G06F 3/0425 715/779 |
| 2013/0055150 A1 | 2/2013 | Galor |
| 2013/0057654 A1 | 3/2013 | Rafii et al. |
| 2013/0063487 A1 | 3/2013 | Spiegel et al. |
| 2013/0069876 A1 | 3/2013 | Cheng et al. |
| 2013/0094329 A1 | 4/2013 | Dahl et al. |
| 2013/0106692 A1 | 5/2013 | Maizels et al. |
| 2013/0107021 A1 | 5/2013 | Maizels et al. |
| 2013/0135312 A1 | 5/2013 | Yang et al. |
| 2013/0147770 A1 | 6/2013 | Dahl et al. |
| 2013/0155031 A1 | 6/2013 | Dahl et al. |
| 2013/0162527 A1 | 6/2013 | Dahl |
| 2013/0176258 A1 | 7/2013 | Dahl et al. |
| 2013/0179034 A1 | 7/2013 | Pryor |
| 2013/0194180 A1 | 8/2013 | Ahn et al. |
| 2013/0201316 A1 | 8/2013 | Binder et al. |
| 2013/0216094 A1 | 8/2013 | DeLean |
| 2013/0236089 A1 | 9/2013 | Litvak et al. |
| 2013/0311925 A1* | 11/2013 | Denker ................. G06F 3/013 715/771 |
| 2013/0335573 A1 | 12/2013 | Forutanpour et al. |
| 2014/0043598 A1 | 2/2014 | Bamji et al. |
| 2014/0119599 A1 | 5/2014 | Dal Mutto et al. |
| 2014/0173440 A1 | 6/2014 | Mutto et al. |
| 2014/0211991 A1 | 7/2014 | Stoppa et al. |
| 2014/0211992 A1 | 7/2014 | Stoppa et al. |
| 2014/0298273 A1 | 10/2014 | Blackstone et al. |
| 2014/0359450 A1* | 12/2014 | Lehtiniemi ........... G06F 3/0488 715/727 |

FOREIGN PATENT DOCUMENTS

| | | |
|---|---|---|
| WO | 2006011153 A2 | 2/2006 |
| WO | 2007052262 A2 | 5/2007 |
| WO | 2006011153 A3 | 10/2008 |
| WO | 2008126069 A2 | 10/2008 |
| WO | 2007052262 A3 | 4/2009 |
| WO | 2008126069 A3 | 4/2009 |
| WO | 2009128064 A2 | 10/2009 |
| WO | 2009142443 A2 | 11/2009 |
| WO | 2009128064 A3 | 1/2010 |
| WO | 2010026587 A1 | 3/2010 |
| WO | 2010030296 A1 | 3/2010 |
| WO | 2010046901 A2 | 4/2010 |
| WO | 2010046901 A3 | 8/2010 |
| WO | 2010086866 A1 | 8/2010 |
| WO | 2010096279 A2 | 8/2010 |
| WO | 2010103482 A2 | 9/2010 |
| WO | 2010096279 A3 | 11/2010 |
| WO | 2010103482 A3 | 11/2010 |
| WO | 2011013079 A1 | 2/2011 |

(56) References Cited

FOREIGN PATENT DOCUMENTS

| | | |
|---|---|---|
| WO | 2011033519 A1 | 3/2011 |
| WO | 2011045789 A1 | 4/2011 |
| WO | 2012011044 A1 | 1/2012 |
| WO | 2012020380 A1 | 2/2012 |
| WO | 2012020410 A2 | 2/2012 |
| WO | 2012066501 A1 | 5/2012 |
| WO | 2012081012 A1 | 6/2012 |
| WO | 2012093394 A2 | 7/2012 |
| WO | 2012095756 A2 | 7/2012 |
| WO | 2012098534 A1 | 7/2012 |
| WO | 2012107892 A2 | 8/2012 |
| WO | 2012119633 A1 | 9/2012 |
| WO | 2012119885 A1 | 9/2012 |
| WO | 2012107892 A3 | 11/2012 |
| WO | 2012164562 A1 | 12/2012 |
| WO | 2013008236 A1 | 1/2013 |
| WO | 2013018099 A2 | 2/2013 |
| WO | 2013021385 A2 | 2/2013 |
| WO | 2012095756 A3 | 7/2013 |
| WO | 2014120554 A2 | 8/2014 |

OTHER PUBLICATIONS

"0V7740 VGA product brief", OmniVision, Retrieved from: http://www.ovt.com/download_document.php?type=sensor&sensor-id=83, 2 pgs.

"PointGrab Announces New Hand Gesture Control Solution for the Latest Premium Samsung Smart TV Models", Yahoo! Finance, Retrieved on Apr. 4, 2013, from http://www.finance.yahoo.com/news/pointgrab-announces-hand-gesture-control-22000959.html, 2 pgs.

Belaroussi, et al., "Comparison of Different Combination Strategies for Face Localization", Proceedings of the 2006 International Conference on Image Processing, Computer Vision, & Pattern Recognition, Las Vegas, Nevada, Jun. 26-29, 2006, pp. 383-389.

Canesta3D, "Canesta 3D ToF Sensor Demo for Living Room", Youtube, Oct. 28, 2010, Retrieved from: http://www.youtube.com/watch?v=TmKShSHOSYU.

Canesta3D, "Canesta PC demo video", Youtube, Oct. 25, 2010, Retrieved from: http://www.youtube.com/watch?v=I36Aqk1A6vY.

Canesta3D, "Canesta TV Gesture User Interface Demo", Youtube, May 29, 2009, Retrieved from: http://www.youtube.com/watch?v=uR27dPHI7dQ.

Canesta3D, "Canesta's latest 3D Sensor—"Cobra" . . . highest res CMOS 3D depth sensor in the world", Youtube, Oct. 25, 2010, Retrieved from: http://www.youtube.com/watch?v=5_PVx1NbUZQ.

Canesta3D, "Future of Remote Control", Youtube, Oct. 29, 2009, Retrieved from: http://www.youtube.com/watch?v=vnfdoDHiNil.

Canesta3D, "Point Cloud Demo, using Canesta's 320×200 3D Tof Image Sensor", Youtube, Oct. 28, 2010, Retrieved from: http://www.youtube.com/watch?v=4xlXsJuH74c.

Carmody, Tim, "Why 'Gorilla Arm Syndrome' Rules Out Multitouch Notebook Displays", Wired, Oct. 21, 2010, Retrieved from http://www.wired.com/gadgetlab/2010/10/gorilla-arm-multitouch/, 3 pgs.

Forsyth, "Computer Vision—A Modern Approach", Recognition as Template Matching, 46 pgs.

Hasan et al., "Real Time Fingers and Palm Locating using Dynamic Circle Templates", International Journal of Computer Applications, vol. 41, No. 6, Mar. 2012, pp. 33-43.

Kerdvibulvech et al., "Markerless Guitarist Fingertip Detection Using a Bayesian Classifier and a Template Matching for Supporting Guitarists", Proc.10th Virtual Reality Int. Conf., Apr. 2008, 7 pgs.

Kolsch et al., "Flocks of Features for Tracking Articulated Objects", Retrieved from http://www.cs.ucsb.edu/~mturk/pubs/KolschBook05.pdf, pp. 1-18, Index.

Lin, John, "Visual Hand Tracking and Gesture Analysis", Dissertation, University of Illinois at Urbana-Champaign, 2004, 116 pgs.

Murase et al., "Gesture Keyboard Requiring Only One Camera", ACM UIST'11, Oct. 16-19, 2011, Santa Barbara, CA, pp. 1-2.

Nosowitz, "The Second Wave of Gesture-Controlled TVs", Popular Science, Retrieved on Apr. 4, 2013, from: www.popsci.com/gadgets/article/2012-01/second-wave-gesture-controlled-tvs, 6 pgs.

Onishi et al., "3D Human Posture Estimation Using HOG Features of Monocular Images", Pattern Recognition, Peng-Yeng Yin (Ed.), Intech, DOI:10.5772/7541., Oct. 1, 2009, pp. 1-11.

Rautaray et al., "Vision Based Hand Gesture Recognition for Human Computer Interaction: A Survey", Artificial Intelligence Review, Springer, Nov. 6, 2012, 54 pgs.

Thayananthan, "Template-based Pose Estimation and Tracking of 3D Hand Motion", Dissertation, University of Cambridge, 2005, 172 pgs.

Zhang, Zhengyou, "Flexible Camera Calibration by Viewing a Plane From Unknown Orientations", Microsoft Research, Redmond, WA, 8 pgs.

* cited by examiner

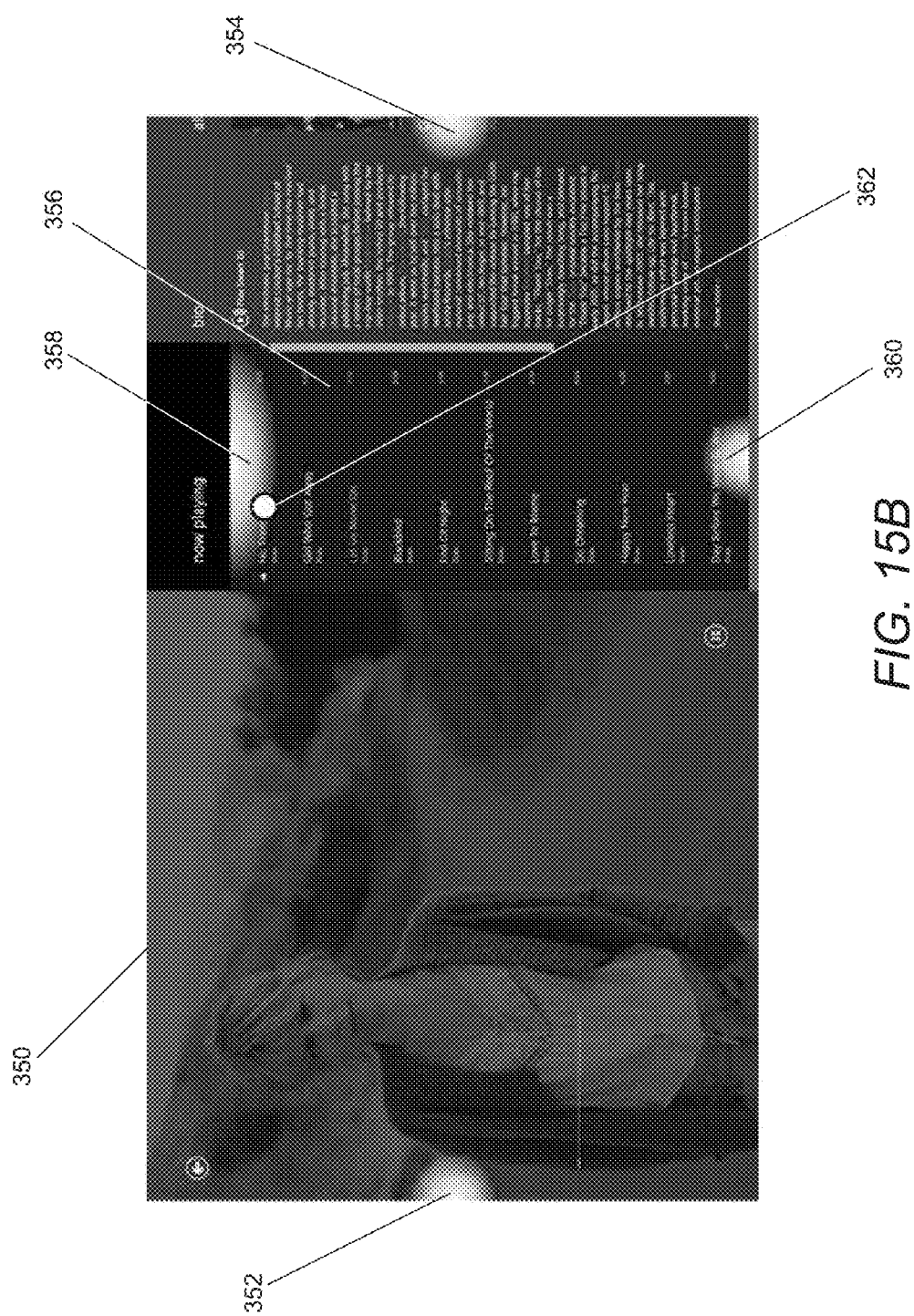

SYSTEMS AND METHODS FOR IMPLEMENTING HEAD TRACKING BASED GRAPHICAL USER INTERFACES (GUI) THAT INCORPORATE GESTURE REACTIVE INTERFACE OBJECTS

CROSS-REFERENCED APPLICATIONS

This application claims priority under 35 U.S.C. §119(e) to U.S. Provisional Application Ser. No. 61/924,686 filed Jan. 7, 2014 which is hereby incorporated by reference as if set forth herewith.

FIELD OF THE INVENTION

The present invention relates generally to user interfaces and more specifically to facial gesture based interaction with interface objects.

BACKGROUND

Operating systems can be found on almost any device that contains a computing system from cellular phones and video game consoles to supercomputers and web servers. A device's operating system (OS) is a collection of software that manages computer hardware resources and provides common services for user application programs. The OS typically acts as an interface between the hardware and the programs requesting input or output (I/O), CPU resources and memory allocation. When an application executes on a computer system with an operating system, the application's code is usually executed directly by the hardware and can make system calls to the OS or be interrupted by it. The portion of the OS code that interacts directly with the computer hardware and implements services for applications is typically referred to as the kernel of the OS. The portion that interfaces with the applications and users is known as the shell. The user can interact with the shell using a variety of techniques including (but not limited to) using a command line interface or a graphical user interface (GUI).

Most modern computing devices support graphical user interfaces (GUI). GUIs are typically rendered using one or more interface objects. Actions in a GUI are usually performed through direct manipulation of graphical elements such as icons. In order to facilitate interaction, the GUI can incorporate one or more interface objects referred to as interaction elements that are visual indicators of user action or intent (such as a pointer), or affordances showing places where the user may interact. The term affordance here is used to refer to the fact that the interaction element suggests actions that can be performed by the user within the GUI.

A GUI typically uses a series of interface objects to represent in a consistent manner the ways in which a user can manipulate the information presented to the user via the user interface. In the context of traditional personal computers employing a keyboard and a pointing device, the most common combination of such objects in GUIs is the Window, Icon, Menu, Pointing Device (WIMP) paradigm. The WIMP style of interaction uses a virtual input device to control the position of a pointer, most often a mouse, trackball and/or trackpad and presents information organized in windows and/or tabs and represented with icons. Available commands are listed in menus, and actions can be performed by making gestures with the pointing device.

The term user experience is generally used to describe a person's emotions about using a product, system or service. With respect to user interface design, the ease with which a user can interact with the user interface is a significant component of the user experience of a user interacting with a system that incorporates the user interface. A user interface in which task completion is difficult due to an inability to accurately convey input to the user interface can lead to negative user experience, as can a user interface that rapidly leads to fatigue.

Touch interfaces, such as touch screen displays and trackpads, enable users to interact with GUIs via two dimensional (2D) gestures (i.e. gestures that contact the touch interface). The ability of the user to directly touch an interface object displayed on a touch screen can obviate the need to display a cursor. In addition, the limited screen size of most mobile devices has created a preference for applications that occupy the entire screen instead of being contained within windows. As such, most mobile devices that incorporate touch screen displays do not implement WIMP interfaces. Instead, mobile devices utilize GUIs that incorporate icons and menus and that rely heavily upon a touch screen user interface to enable users to identify the icons and menus with which they are interacting.

Multi-touch GUIs are capable of receiving and utilizing multiple temporally overlapping touch inputs from multiple fingers, styluses, and/or other such manipulators (as opposed to inputs from a single touch, single mouse, etc.). The use of a multi-touch GUI may enable the utilization of a broader range of touch-based inputs than a single-touch input device that cannot detect or interpret multiple temporally overlapping touches. Multi-touch inputs can be obtained in a variety of different ways including (but not limited to) via touch screen displays and/or via trackpads (pointing device).

In many GUIs, scrolling and zooming interactions are performed by interacting with interface objects that permit scrolling and zooming actions. Interface objects can be nested together such that one interface object (often referred to as the parent) contains a second interface object (referred to as the child). The behavior that is permitted when a user touches an interface object or points to the interface object is typically determined by the interface object and the requested behavior is typically performed on the nearest ancestor object that is capable of the behavior, unless an intermediate ancestor object specifies that the behavior is not permitted. The zooming and/or scrolling behavior of nested interface objects can also be chained. When a parent interface object is chained to a child interface object, the parent interface object will continue zooming or scrolling when a child interface object's zooming or scrolling limit is reached.

The evolution of 2D touch interactions has led to the emergence of user interfaces that are capable of 3D interactions. A variety of machine vision techniques have been developed to perform three dimensional (3D) gesture detection using image data captured by one or more digital cameras (RGB and/or IR), or one or more 3D sensors such as time-of-flight cameras, and structured light cameras. Detected gestures can be static (i.e. a user placing her or his hand in a specific pose) or dynamic (i.e. a user transition her or his hand through a prescribed sequence of poses). Based upon changes in the pose of the human hand and/or changes in the pose of a part of the human hand over time, the image processing system can detect dynamic gestures.

SUMMARY

The above and other problems are solved and an advance in the art is made by systems and methods for implementing head tracking based graphical user interfaces that incorporate gesture reactive interface objects in accordance with some embodiments of the invention.

In accordance with some embodiments of the invention, a method of rendering a user interface on a computing device is performed in the following manner. An initial user interface comprising a set of interface objects is rendered using a computing device. Each interface object in the set of interface objects includes a graphical element that is rendered when the interface object is rendered for display and a target zone within the user interface. Captured image data is then received by the computing device. A targeting gesture in captured image data that identifies a targeted interface object within the user interface is detected using the computing device. In response to the detection of the targeting gesture, the computing device enables a set of one or more interaction 3D head gestures for the targeted interface object. Each of the one or more interaction head gestures is associated with a permitted interaction in a set of permitted interactions allowed for the targeted interface object and each permitted interaction is an action performed via the user interface to manipulate the targeted interface object.

The computing device then receives additional captured image data. The motion of the at least a portion of the human head in the additional captured image data that corresponds to an interaction 3D head gesture from the set of one or more interaction 3D head gestures enabled for the targeted interface object that identifies a specific interaction from the set of permitted interactions with the targeted interface object is identified using the computing device. The user interface is modified in response to the specific interaction with the targeted interface object identified by the detected interaction 3D gesture using the computing device. The modified user interface is then rendered using the computing device.

In accordance with many embodiments, the computing device is part of a real-time gesture based interactive system further comprising a display device and an image capture system. In accordance with some of these embodiments, the method further includes displaying the rendered user interfaces using the display and capturing the captured image data and the additional captured image data using the image capture system.

In accordance with many embodiments, the targeting gesture is a 3D motion. In accordance with various embodiments, the targeting gesture is a 2D motion. In accordance with a number of embodiments, the targeting gesture is a 3D head gesture. In accordance with several embodiments, the targeting 3D head gesture is a staring motion towards the target zone of the targeted interface.

In accordance with some embodiments, the method further includes changing the rendering of at least the targeted interface object within the user interface in response to the targeting gesture targeting the interface object using the computing device. In many embodiments, the changing of the rendering of at least the targeted interface object within the user interface object using the computing device includes changing the size of the graphical element of the targeted interface object. In accordance with a number of embodiments, the changing of the rendering of at least the targeted interface object within the user interface in response to the targeting gesture using the computing device includes changing the size of the graphical elements of a plurality of interface objects including the targeted interface object. In accordance with several embodiments, the changing of the rendering of at least the targeted interface object within the user interface in response to the targeting gesture using the computing device includes changing the size of the target zone of the targeted interface object and rendering a graphical element indicating the location of the target zone. In accordance with a few embodiments, the changing of the rendering of at least the targeted interface object within the user interface in response to the targeting gesture using the computing device includes changing the size of the target zone of a plurality of interface objects including the targeted interface object and rendering graphical elements indicating the location of the target zone of each of the plurality of interface objects.

In accordance with some embodiments, the method also includes displaying an interaction element indicating the time remaining to interact with the targeted interface object in response to the targeting gesture targeting the targeted interface object for a predetermined period of time using the computing device. In accordance with several embodiments, the identifying of the change in pose and the determining of the interaction 3D head gesture from the set of one or more interaction 3D head gestures for the targeted interface object that identifies a specific interaction with the targeted interface object that corresponds to the change in pose occurs within a predetermined time period from the receipt of the detection of the targeting gesture.

In accordance with a number of embodiments, the determining that the change of pose of at least a portion of a human head corresponds to an interaction 3D head gesture from the set of one or more interaction gestures for the targeted interface objects identifying motion corresponding to at least one motion selected from the group consisting of: nodding the head in a side to side motion; shaking the head in an up and down motion; and blinking the eyes.

In accordance with some embodiments, the determining that the targeting gesture targets the targeted interface object for a predetermined period of time considers the targeting gesture to be targeting the targeted interface object during any period of time in which the targeting gesture does not target the interface object that is less than a hysteresis threshold.

In accordance with some embodiments, the method further includes detecting an input via a 3D head gesture input modality from captured image data using the computing device and changing the manner in which the initial user interface is rendered in response to detection of input via a 3D head gesture input modality using the computing device. In accordance with a number of embodiments, the changing of the manner in which the initial user interface is rendered in response to detection of input via a 3D head gesture input modality includes changing at least one selected from the group consisting of: the size of the graphical elements of the interface objects; the size of the target zones of the interface objects and rendering graphical elements showing the locations of the target zones; and the size of the region of the user interface that is rendered. In accordance with many embodiments, the detecting of an input via a 3D head gesture input modality includes determining a distance from the display at which 3D head gestures are being performed to provide 3D head gesture input from the captured image data, changing the manner in which the initial user interface is rendered in response to detection of input via a 3D head gesture input modality including changing the manner in which the user interface is rendered based upon the distance from the display at which 3D head gestures are being performed to provide 3D head gesture input.

In accordance with some embodiments, the method also includes determining a distance of a head of a user from a display on which the rendered user interface is being displayed using the computing device, and changing the manner in which the initial user interface is rendered by the computing device based upon the distance of the head of the user from the display on which the rendered user interface is being displayed. In accordance with many embodiments, the changing the manner in which the initial user interface is rendered based upon the distance of the head of the user from the display on which the rendered user interface is being displayed includes changing at least one of the following from the group consisting of: the size of the graphical elements of the interface objects, the size of the target zones of the interface objects and rendering graphical elements showing the locations of the target zones, and the size of the region of the user interface that is rendered.

In accordance with some of the embodiments, the size of at least one selected from a group consisting of a rendered graphical element of at least one interface object and a target zone of at least one interface object is determined based upon at least one of the size of a display on which the rendered user interface is displayed and the resolution of the display.

In accordance with some embodiments, the method further includes increasing the size of the target zone of the targeted interface object within the user interface in response to the detection of the targeting gesture that targets the interface object using the computing device.

In accordance with some embodiments, the method includes detecting an input via a 3D head gesture input modality from captured image data using the computing device, and increasing the size of the target zones of at least one interface object within the user interface in response to the detection of the input via the 3D head gesture input modality using the computing device.

In accordance with many embodiments, the detecting of a targeting 3D gesture that targets the target zone of one of the interface objects within the user interface includes identifying a 3D interaction zone within the captured image data that maps to the user interface, determining the location of an object performing the targeting gesture within the 3D interaction zone mapping the location of the object within the 3D interaction zone to a location within the user interface, determining that the mapped location within the user interface falls within the target zone of an interface object, and identifying the interface having the target within which the mapped location falls is the targeted interface object. Furthermore, the detecting of the interaction 3D head gesture from the set of one or more interaction gestures for the targeted interface object in the additional captured image data that identifies a specific interaction with a targeted interface object using the computing device includes tracking motion of at least a portion of a human head within the 3D interaction zone, and determining that the tracked motion of at least a portion of a human head within the 3D interaction zone corresponds to an interaction 3D head gesture from the set of one or more interaction head gestures for the targeted interface object.

In accordance with some embodiments, a method of rendering a user interface on a real-time gesture based interactive system comprising an image capture system including at least two cameras, an image processing system and a display device is performed in the following manner. an initial user interface comprising a set of interface objects is rendered using the image processing system. Each interface object includes a graphical element that is rendered when the interface object is rendered for display, a target zone that defines at least one region in the user interface in which a targeting three-dimensional (3D) gesture targets the interface object, and a description of a set of permitted interactions. The method displays the rendered user interface using the display. Image data is captured using the image capture system. An input via a 3D head gesture input modality from the captured image data is detected using the image processing system. The manner in which the initial user interface is rendered is changed in response to detection of an input via a 3D head gesture input modality using the image processing device and the rendered user interface is displayed using the display. A 3D interaction zone within the captured image data that maps to the user interface is identified. A location of at least a portion of a human head within the 3D interaction zone is determined from the captured image data. A first pose of the at least a portion of a human head within the target zone that corresponds to a targeting 3D head gesture is identified. the location of the at least a portion of a human head within the 3D interaction zone is mapped to a location within the user interface. The mapped location within the user interface is determined to fall within the target zone of a specific interface object in the user interface. The specific interface object is identified as a targeted interface object in response to an identification of the first pose as a targeting head gesture and a determination that the mapped location of the at least a portion of the human head falls within the target zone of the specific interface object in the user interface. The rendering of at least the targeted interface object within the user interface in response to the targeting 3D head gesture is changed using the image processing system and displayed via the display.

Additional image data is captured using the image capture system. The image processing system determines that a 3D head gesture targets the targeted interface object for a predetermined period of time. The determination considers the targeting 3D head gesture to be targeting the targeted interface object during any period of time in which the targeting 3D head gesture does not target the targeted interface object that is less than a hysteresis threshold. In response to a determination of a 3D head gesture targeting a targeted interface object, a set of one or more interaction 3D head gestures for the targeted interface object is enabled using the computing device. Each of the one or more interaction gestures is associated with a permitted interaction in a set of permitted interactions allowed for the targeted interface object and each permitted interaction is an action performed via the user interface to manipulate the targeted interface object. An interaction element indicating the time remaining to interact with the targeted interface object is displayed in response to a determination that the targeting 3D head gesture has targeted the interface object for a predetermined period of time using the image processing system. The motion of at least a portion of a human head is tracked within the 3D interaction zone in additional captured image data captured within a predetermined time period from the detection of the targeting 3D head gesture input using the image processing system.

A change in pose for the at least a portion of a human head within the 3D interaction zone from the first pose to a second pose during the motion of the at least a portion of the human head within the 3D interaction zone during the motion is identified using the image processing system. The motion of the at least a portion of the human head is determined to correspond to a specific interaction 3D head gesture from the set of one or more interaction gestures enabled for the targeted interface object that identifies a specific interaction with the targeted interface object using the image processing system The specific interaction 3D head gesture associated with a specific interaction within the set of permitted interactions for the interface object is verified using the image processing system and the user interface is modified in response to the specific interaction with the targeted interface object identified by the specific interaction 3D head gesture using the image processing system. The modified user interface is rendered using the image processing system and displayed using the display.

In accordance with some embodiments, a real-time gesture based interactive system configured to display a user interface and receive three-dimensional (3D) gesture based input includes a processor; an image capture system configured to capture image data and provide the captured image data to the processor; a memory containing an operating system, an interactive application, and a 3D gesture tracking application. the interactive application and the operating system configure the processor to generate and render an initial user interface comprising a set of interface objects, where each interface object includes a graphical element that is rendered when the interface object is rendered for display and a target zone that defines at least one region in the user interface in which the interface object is to be targeted, and modify an initial user interface in response to a detected interaction with a targeted interface object and render an updated user interface.

The 3D gesture tracking application and the operating system configure the processor in the following manner the process is configured to capture image data using the image capture system. The process is further configured to detect a targeting gesture from the captured image data. The processor may be configured to identify a specific interface object as the targeted interface object in response to a detection of the targeting gesture and enable a set of one or more interaction 3D head gestures for the targeted interface object in response to the identifying of the targeting gesture wherein each of the one or more interaction 3D head gestures is associated with a permitted interaction in a set of permitted interactions allowed for the targeted interface object and each permitted interaction is an action performed via the user interface to manipulate the targeted interface object. The processor is further configured to change the rendering of at least the targeted interface object within a user interface in response to detection of a targeting 3D gesture that targets the interface object and capture additional image data. The processor is further configured to track the motion of at least a portion of a human head in additional captured image data captured by the image capture system within a predetermined time period from the detection of the targeting gesture input using the image processing system and determine the motion of the at least a portion of the human head corresponds to a specific interaction 3D head gesture from the set of one or more interaction gestures enabled for the targeted interface object that identifies a specific interaction with the targeted interface object using the image processing system. The processor is then configured to provide events corresponding to the specific interaction with targeted interface object to the interactive application.

BRIEF DESCRIPTION OF THE DRAWINGS

FIGS. 15A and 15B conceptually illustrate the modification of a user interface including nested interface objects to increase the size of an interface element within a nested interface object when the interface element is targeted via a head gesture in accordance with an embodiment of the invention.

DETAILED DISCLOSURE OF THE INVENTION

Figure 1:
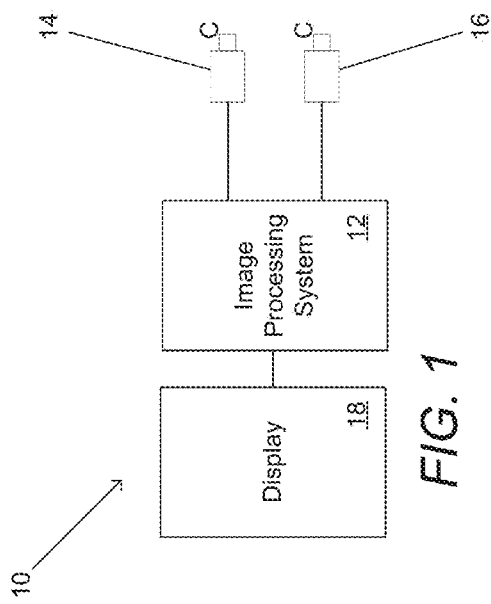
FIG. 1 is a high level block diagram of a system configured to perform real-time tracking of head gestures and provide a head tracking based interactive user interface.

Turning now to the drawings, systems and methods for implementing head gesture based graphical user interfaces (GUI) that incorporate gesture reactive interface objects in accordance with embodiments of the invention are illustrated. For purposes of this discussion, a head gesture includes, but is not limited to, the placement of the head in a certain pose, moving the head in a certain pattern, placing the head in a certain orientation, the direction in which the eyes in the head are directed (staring or gazing), facial expressions and/or any other action that may be accomplished using the head and/or features of the head and or face of a user. Enabling a user to interact with a GUI using head gestures in 3D space can present particular challenges. Unlike interaction with a pointing device or touch screen, users interact with a head gesture based GUI at a distance, and typically rely on visual feedback without the benefit of the tactile sensations obtained from touching an object or moving an object across a surface. Furthermore, head gesture inputs can involve considerably more bio-mechanical effort by a user when compared to other input mechanisms such as touch screens and pointing devices. The systems and methods disclosed in U.S. Pat. No. 8,830,312 entitled "Systems and Methods for Tracking Human Hands using Parts Based Template Matching within Bounding Regions" and U.S. Pat. No. 8,615,108 entitled "System and Method for Initializing Motion Tracking of Human Hands enable the detection of hand gestures within a small 3D interaction zone. The disclosures of U.S. Pat. Nos. 8,830,312 and 8,615,108 are incorporated by reference herein in their entirety.

A typical user is unable to perform a head gesture with the same precision as a 2D hand gesture (e.g. a touch interaction via a touch screen). Therefore, a challenge of head gesture based user interface design is to enable the user to efficiently and unambiguously interact with a GUI at a distance. The challenge can be particularly acute when attempting to design a user interface that can be utilized for interaction via both 2D and 3D head gestures.

Head gesture based GUIs in accordance with many embodiments of the invention include interface objects that react to head gestures to simplify the user's interaction with the interface objects. These interface objects can be referred to as gesture reactive interface objects in that the manner in which the interface object is presented to the user and/or the manner in which the user can interact with the interface object changes based upon the head gesture input provided by the user. As is discussed further below, many embodiments of the invention achieve a similar effect through continuous substitution of interface objects in response to head gesture inputs. As can readily be appreciated, the specific approach that is utilized typically depends upon the requirements of a given application.

For the purpose of the discussion that follows, a head gesture reactive interface object can be considered to be a part of a head gesture based GUI that can be represented as a graphical element within a display rendered by the GUI. A head gesture reactive interface object can define a target zone within the displayed user interface in which a user can initiate actions with respect to the interface object. As is discussed further below, the target zone can be defined independently of the size of the graphical element corresponding to the interface within the GUI and the target zone can itself have an associated graphical element that provides the user with visual feedback when the user approaches and/or encroaches upon the target zone of an interface object. The types of head gesture interactions that a user can use to interact with a gesture reactive interface object can be separately specified for each interface object.

In many embodiments, the head gesture based GUI includes gesture reactive interface objects that can change the size of displayed graphical elements based upon the distance from the display at which the user is performing the 3D gesture and/or the size and/or resolution of the display. The greater the distance a user is from a given display, the harder it is typically for a user to target graphical elements on the display and/or the greater the effort for the user to continuously target a graphical element for an extended period of time. Therefore, including interface objects that react to the distance from the display at which a user is providing head gesture input can enable the user to more easily interact with the GUI using head gestures at increased distance. Furthermore, interface objects in accordance with many embodiments of the invention can react to the size and/or resolution of a display. In a number of embodiments, the size of graphical elements of interface objects is determined based upon the number of pixels per inch of the display. In other embodiments, any of a variety of criteria related to the size and/or resolution of a display can be utilized to determine the size of graphical elements in a user interface. In certain embodiments, the size and/or resolution of the display is considered in combination with the distance of the user from the display in order to determine the size with which graphical objects within the user interface are presented to the user.

In several embodiments, the target zone of an interface object can be defined independently of the size of the graphical element corresponding to the interface object in the user interface display. In this way, a user can interact with an interface object by pointing at a location on the display that does not contain the graphical element corresponding to the interface object within the GUI. It should be noted that the target zone may include its own graphical element. In which case, the graphical element of the interface object can be thought of as including the graphical element of the target zone. In many embodiments, the GUI can identify the spacing of interface objects and determines the size of the target zone associated with an interface object beyond the size of the graphical element used to represent the interface object within the display. In this way, a user can target a graphical element with lower accuracy in order to interact with the interface object. In certain embodiments, the size with which the target zone of an interface object is increased is determined based upon the distance from the display at which the user is providing head gesture input and/or the size and/or resolution of the display. Accordingly, the head gesture based GUI can accommodate the decrease in accuracy with which a user can target graphical elements on a display that typically occurs as the user moves further from the display. In many embodiments, the GUI increases the size of the target zone of an interface object following the user initiating an interaction with the interface object. In this way, the user can relax the accuracy with which the user is targeting the display.

As can readily be appreciated, the ability of a head gesture based GUI to increase the size of the target zones associated with interface objects within the GUI can be constrained by a variety of factors including (but not limited to) the spacing of interface objects. In a number of embodiments, the head gesture based GUI identifies dense groupings of interface objects and automatically zooms a portion of the GUI when a user targets the target zone of any one of the interface objects. In several embodiments, related interface objects are zoomed (e.g. volume and track selection for a music player) irrespective of the spacing of the interface objects. Accordingly, the user interface may zoom a layout of interface objects as opposed to simply a cluster of interface objects. The decision to zoom can be informed by the size of the interface objects, the spacing of the interface objects, the relevance of the interface objects, the distance of the user from the display and/or the size and/or resolution of the display. In certain embodiments, a user can initiate the zooming of a region of the user interface by making a head gesture such as, but not limited to, staring at an interface object to create an effect whereby "pushing" within the target zone of one of a grouping of interface objects causes the grouping of interface objects to increase in size. In other embodiments, any of a variety of head gestures can be utilized to initiate zooming of a user interface to facilitate selection of an interface object.

In many applications, benefits can be derived by enabling the user to initiate interaction with a head gesture reactive interface object using a first head gesture and then enabling the user to continue the interaction with a second head gesture. For example, a user can stare at a target zone of a head gesture reactive interface object to commence scrolling the user interface and, once the interaction is initiated, stop staring at the target zone and make a second gesture such as (but not limited to) nodding the user's head to continue the scrolling. Allowing the user to relax her or his head to perform the second gesture can minimize fatigue. Similarly, the manner in which a user selects an interface object (i.e. an action corresponding to a mouse "click") can be head gesture reactive. In a number of embodiments, the process of clicking a gesture reactive interface object is initiated by targeting the target zone of an interface object using a first head gesture, such as staring at the interface object for a predetermined period of time. Once the selection process is initiated, the user can cease the staring gesture and complete the selection by performing a second head gesture such as (but not limited to) shaking or nodding the head in a manner evocative of clicking a mouse or pushing down with the tip of a finger. In many embodiments, the user interface provides visual feedback during the selection process to indicate that the initial head gesture has been detected and that a user may perform a second head gesture to complete the selection and/or a visual indication of the time available for the user to complete the second head gesture to complete the selection. In several embodiments, the user is able to pause for an unconstrained period of time between the initiation of the selection process and performing the second head gesture to complete the selection process. In the event that the user decides not to complete the selection process, the user can simply continue interacting with the GUI by staring at other interface objects and/or can perform a cancelation head gesture to terminate the targeting of an interface object.

In several embodiments, the head gesture based user interface includes a number of head gesture reactive interaction elements that are affordances showing places where the user may interact with the GUI via a head gesture. An affordance is a visual suggestion of an action that can be performed by the user within the GUI and is typically distinct from a cursor or guidance arrow that indicates the current position and/or action being performed by the user. In many embodiments, the size of the head gesture reactive interaction element increases once a user starts interacting with the interaction element. In this way, the user can relax the accuracy with which the user is interacting with the display. In several embodiments, a user's interaction with a head gesture reactive interaction element increases the size of the target zone of the interaction element (i.e. the target zone increases in size even though the graphical representation of the interaction element on screen remains the same size) to achieve a similar effect without modification of the display. In many embodiments, targeting of an interaction element that is an affordance enables the selection of the interaction element in a manner similar to that described above with respect to head gesture reactive interface objects in general. As such, a user can target an affordance with a first head gesture and can initiate an action like scrolling and/or panning (collectively referred to as scrolling herein) using a second interaction head gesture.

Systems that utilize head gesture based GUIs incorporating gesture reactive interface objects and processes for enabling interaction with gesture reactive interface objects based upon head gesture inputs in accordance with embodiments of the invention are discussed further below.

Head Gesture Based Interactive Systems

A head gesture based interactive system in accordance with an embodiment of the invention is illustrated in FIG. 1. The head gesture based interactive system 10 includes an image processing system 12 configured to receive image data captured by at least one camera 14. In many embodiments, the real-time gesture based interactive system 10 processes the captured image data to determine the location and pose of a human head. Object detection of a human head can be challenging. In several embodiments, the head gesture based interactive system uses a head tracking and/or gaze tracking process to detect head gestures by the user. In other embodiments, any of a variety of head tracking and/or gaze tracking processes can be utilized to determine the location of the user's head and/or the user's viewpoint in accordance with embodiments of the invention. These techniques can include model-based approaches that operate by applying model-dependent hypotheses to observable visual data. In various embodiments, geometric models can be used to represent the head (e.g. ellipsoidal, cylindrical, as well as more sophisticated models). In various other embodiments, training-based approaches can also be incorporated. In these embodiments, training can include providing many variations in anatomy, pose, orientation, perspective, and scale. In other embodiments, any of a variety of head tracking techniques can be utilized as appropriate to the requirements of specific applications.

Based upon the location and pose of a detected human head, the image processing system can detect head gestures including (but not limited to) an initialization gesture indicating that the user is commencing head gesture based interaction with the system and gestures that indicate the user's intention to interact with a specific interface object within the user interface. Head gestures can be static (i.e. a user placing her or his head in a specific pose) or dynamic (i.e. a user transitioning her or his head through a prescribed sequence of poses). Based upon changes in the pose of the human head and/or changes in the pose of a part of the human head over time, the image processing system can detect dynamic gestures. In a number of embodiments, the head gesture based interactive system 10 includes a display 18 via which the head gesture based interactive system can present a user interface incorporating gesture reactive interface objects to the user. As noted above, the presentation of head gesture reactive interface objects and/or the manner in which a user can interact with the interface objects changes as a reaction or in response to the 3D gesture input provided by the user.

In many embodiments, the manner in which a gesture reactive interface object is displayed within the user interface and/or the size of the target zone associated with the interface object is determined based on a variety of factors including (but not limited to) the distance of the user from the display, the location of the display, the size of the display, the resolution of the display, the displayed content, the provider of the displayed content, and/or user-tunable factors. In other embodiments, the manner in which the head gesture reactive interface object is displayed and/or the interactions permitted by the interface object are modified when a user targets the interface object via a head gesture. In the context of a head gesture based interactive system in accordance with many embodiments of the invention, the concept of targeting an interface object is separate from the concept of selecting the interface object. A head gesture that targets an interface object is a head gesture that (like a pointing device) points a cursor at an interface object, but does not select the interface object. As discussed further below, many embodiments of the invention utilize a selection process in which an object is targeted by a first targeting head gesture, the user interface is modified to inform the user that the object is selectable and/or the time remaining in which the interface object is selectable, and the selection process is completed using a separate second selection head gesture. In this way, the user interface is not simply providing a user experience that treats head gestures as another form of pointer input, such as the input that would be received via a mouse or a trackpad. Instead, head gesture reactive interface objects respond to head gestures in a way that provides a user experience in which the process of selecting interface objects is easier and less tiring to complete. The various ways in which head gesture reactive user interface elements can be utilized to provide a user experience customized for head gesture based interaction in accordance with embodiments of the invention are discussed further below.

Although a specific head gesture based interactive system including two cameras is illustrated in FIG. 1, any of a variety of real-time gesture based interactive systems configured to capture image data from at least one view can be utilized as appropriate to the requirements of specific applications in accordance with embodiments of the invention. Image processing systems in accordance with embodiments of the invention are discussed further below.

Image Processing Systems

Figure 2:
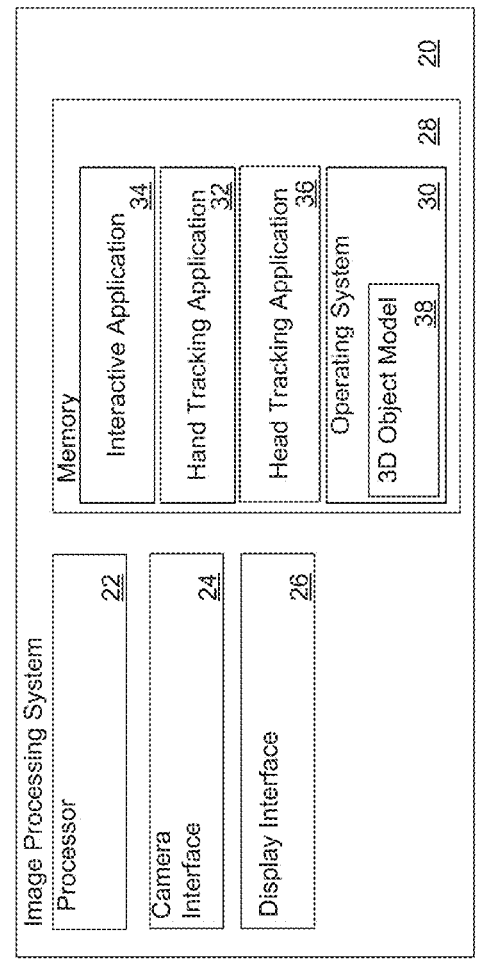
FIG. 2 is a high level block diagram of an image processing system in accordance with an embodiment of the invention.

Image processing systems in accordance with many embodiments of the invention can be implemented using a variety of software configurable computing devices including (but not limited to) personal computers, tablet computers, smart phones, embedded devices, and consumer electronics devices such as (but not limited to) televisions, disc players, set top boxes, and game consoles. An image processing system in accordance with an embodiment of the invention is illustrated in FIG. 2. The image processing system 20 includes a processor 22 that is configured to communicate with a camera interface 24 and a display interface 26. The image processing system also includes memory, which can take the form of one or more different types of storage including semiconductor and/or disk based storage. In the illustrated embodiment, the processor 22 is configured using an operating system 30. The memory 28 also includes a hand tracking application (or object racking application) 32, a head tracking application 36, and may include an interactive application 34. In the illustrated embodiment, the operating system 30 is also configured to maintain a 3D object model 38 based on the viewpoint of the user as determined by tracking the position of the user's head. The hand tracking application can be utilized to process image data received via the camera interface 24 to identify hand gestures and/or the orientation and distance of individual fingers. These hand gestures can include motions that when mapped from a 3D zone of interaction to a location within the 3D object model 38 communicate specific user interface actions including (but not limited) to mouse, pen, touch, or 3D gesture events. These hand gestures can be processed by the processor 22 to enable the user to interact with a user interface based upon a 3D object model 38 maintained by the operating system 30 and rendered by the image processing system 20. In many embodiments, the user interface can be generated by the operating system 30 or the interactive application 34. The head tracking application can also be utilized to process image data received via the camera interface 24 to identify head motions and/or the orientation and distance of the head. These head motions and/or orientations can be processed by the processor 22 to enable the user to interact with a user interface based upon a 3D object model 38 maintained by the operating system. In many embodiments, this user interface based upon a 3D object model 38 can be generated by the operating system 30 and/or the interactive application 34 making calls to the operating system and can be rendered by the image processing system 20. In other embodiments, any of a variety of configurations of computer programs within memory of an image processing system can be utilized as appropriate to the requirements of a specific application.

In many embodiments, the processor receives frames of video data via the camera interface 24 from at least one camera. The camera interface can be any of a variety of interfaces appropriate to the requirements of a specific application including (but not limited to) the USB 2.0 or 3.0 interface standards specified by USB-IF, Inc. of Beaverton, Oreg., and the MIPI-CSI2 interface specified by the MIPI Alliance. In a number of embodiments, the received frames of video data include image data represented using the RGB color model represented as intensity values in three color channels. In several embodiments, the received frames of video data include monochrome image data represented using intensity values in a single color channel. In several embodiments, the image data represents visible light. In other embodiments, the image data represents intensity of light in non-visible portions of the spectrum including (but not limited to) the infrared, near-infrared, and ultraviolet portions of the spectrum. In certain embodiments, the image data can be generated based upon electrical signals derived from other sources including but not limited to ultrasound signals. In several embodiments, the received frames of video data are compressed using the Motion JPEG video format (ISO/IEC JTC1/SC29/WG10) specified by the Joint Photographic Experts Group. In a number of embodiments, the frames of video data are encoded using a block based video encoding scheme such as (but not limited to) the H.264/MPEG-4 Part 10 (Advanced Video Coding) standard jointly developed by the ITU-T Video Coding Experts Group (VCEG) together with the ISO/IEC JTC1 Motion Picture Experts Group. In certain embodiments, the image processing system receives RAW image data. In several embodiments, the camera systems that capture the image data also include the capability to capture dense depth maps and the image processing system is configured to utilize the dense depth maps in processing the image data received from the at least one camera system. In several embodiments, the camera systems include 3D sensors that capture dense depth maps including (but not limited to) time-of-flight and/or structured light cameras.

In many embodiments, the display interface 26 is utilized to drive a display device that can be integrated within the image processing system and/or external to the image processing system. In a number of embodiments, the HDMI High Definition Multimedia Interface specified by HDMI Licensing, LLC of Sunnyvale, Calif. is utilized to interface with the display device. In other embodiments, any of a variety of display interfaces appropriate to the requirements of a specific application can be utilized.

Although a specific image processing system is illustrated in FIG. 2, any of a variety of image processing system architectures capable of executing head tracking and hand tracking processes can be utilized in accordance with embodiments of the invention. Processes for updating user interfaces incorporating head gesture reactive interface objects in response to detected head gestures in accordance with embodiments of this invention are discussed below.

Updating User Interfaces in Response to Head Gestures

A variety of characteristics of a head gesture can cause the modification of the manner in which a user interface is displayed. In several embodiments, the user interface is updated simply as a function of the detection of input via a head gesture as opposed to via another input modality. In certain embodiments, detection of a head gesture and/or other distance measurement techniques can be used to detect the distance of the user from the display on which the user interface is displayed and to adjust the size of rendered graphical elements and/or target zones of gesture reactive interface objects within the user interface. In this context, head gesture reactive interface elements are responding not so much to the specific head gesture being detected, but to the distance at which the head gesture is being performed. In many embodiments, the manner in which the user interface responds to detection of a head gesture is directly related to the specific head gesture that is detected. In several embodiments, head gesture reactive interface objects within the user interface are configured to react to targeting of the interface object by a head gesture. Once targeted, the user interface can change the graphical representation of the interface object, and/or permit additional head gesture based interactions with the interface object. Depending upon the configuration of the head gesture reactive interface objects, the size of the graphical element and/or target zone of an interface object can increase and/or be zoomed to facilitate the targeting of the interface object and the selection of the interface object can be completed without the need to continue targeting the interface object.

Figure 3:
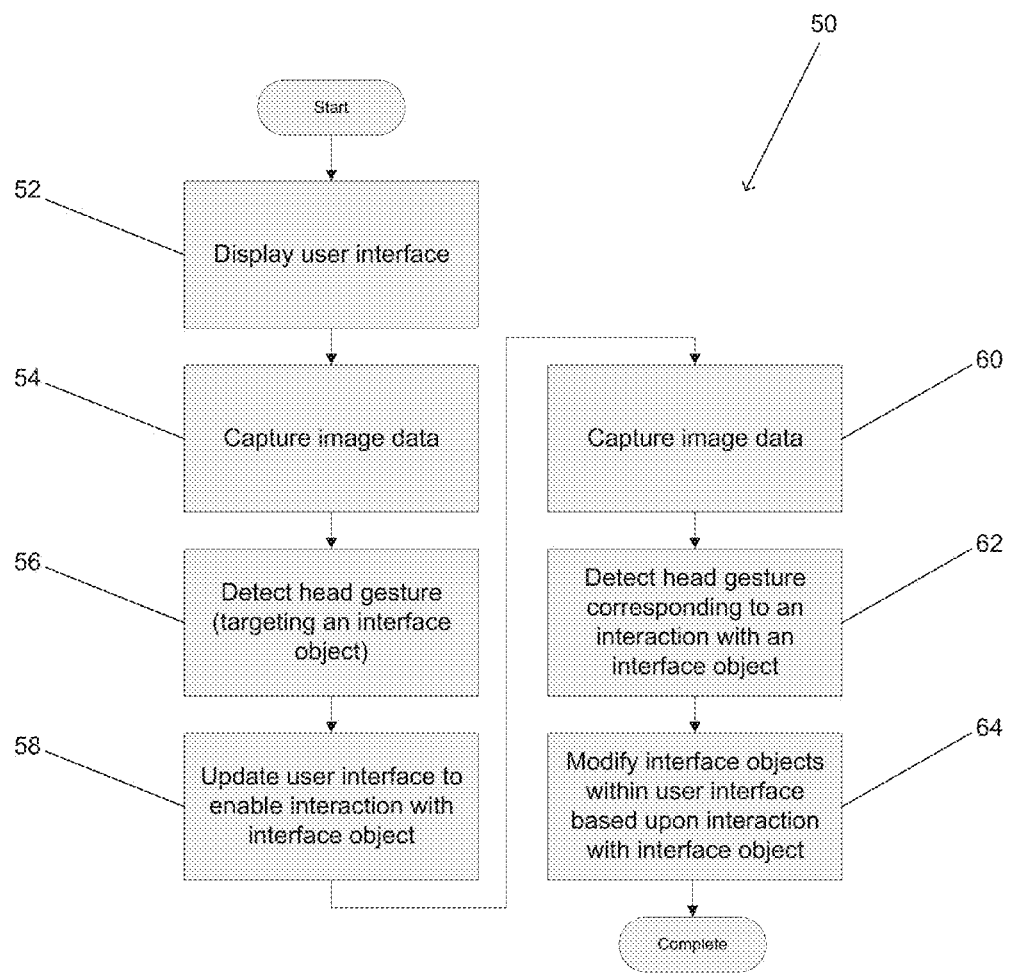
FIG. 3 is a high level flow chart illustrating a process for updating a user interface in response to a head gesture to facilitate the user's interaction with an interface object via another head gesture in accordance with an embodiment of the invention.

A process for modifying the manner in which head gesture reactive interface objects are displayed to a user via a user interface in response to detection of a head gesture in accordance with an embodiment of the invention is illustrated in FIG. 3. The process 50 includes displaying (52) an initial user interface and capturing (54) image data. Using the captured image data (56) a head gesture can be detected. As noted above, the process of updating the displayed GUI can utilize the head gesture to determine the distance of the user from the display on which the user interface is presented. In many embodiments, the head gesture can indicate an interface object targeted by the user.

Depending upon the head gesture reactive interface elements incorporated in the user interface and/or the detected head gesture, the user interface is updated (58) to facilitate interaction with interface objects via head gesture inputs. As discussed in detail below, a variety of techniques can be utilized to facilitate interaction with interface objects in accordance with embodiments of the invention including (but not limited to) increasing the size of the graphical element depicting the interface object, increasing the target zone of the interface object, zooming the portion(s) of the user interface containing a layout of interface objects, and/or permitting interactions with the interface object using head gestures that do not necessitate the continuous targeting of the interface object.

When the user interface has been updated (58), additional image data can be captured (60) and a head gesture corresponding to an interaction with an interface object can be detected. In response to the interaction, the user interface can be modified (64) to add and/or remove interface objects to reflect the changes resulting from the interaction (e.g. rendering a new interface page in a web browsing application, or changing the output and/or media being played back in a media player application).

The process for updating a user interface by changing the presentation of head gesture reactive interface objects in response to receipt of head gestures is distinct from the process of changing the interface objects that are incorporated in the user interface in response to an interaction with an interface object via a head gesture. When a user interface is updated to change the presentation of head gesture reactive interface objects in response to a head gesture, the user interface is typically rendered from the same set of interface objects. The head gesture is simply causing specific interface objects within the user interface to be rendered in a different manner. Changing the set of interface objects also modifies the manner in which a user interface is rendered. The modification is due to the different combination of interface objects from which the user interface is rendered and not due to changes in the manner in which the same combination of head gesture reactive interface objects are rendered.

While there are many benefits to utilizing head gesture reactive interface objects to enable updating of a user interface in a manner that is responsive to head gestures, the process of updating a user interface in response to a head gesture can involve substituting interface objects in a manner that emulates a head gesture reactive interface object. In several embodiments, a management process continuously monitors received head gesture inputs and substitutes interface objects within the user interface and/or emulates inputs via other input modalities supported by an operating system to modify the presentation of the user interface in response to the head gesture. Accordingly, characteristics of the interface objects such as the size of graphical elements and/or target zones are not changing. Instead, interface objects with different sized graphical elements and/or target zones are substituted in response to received 3D gestures. As can be readily appreciated, utilizing gesture reactive interface objects is similar to the use of a management process that substitutes interface objects in response to 3D gestures. While much of the discussion contained herein references the use of gesture reactive interface objects, the specific approach that is utilized is typically dependent upon the requirements of a given application. Accordingly, the various systems and processes described herein that incorporate the use of gesture reactive interface objects should be understood as also capable of implementation using interface object substitution in accordance with embodiments of the invention.

Although specific processes for modifying a user interface in response to head gestures to facilitate interaction with interface objects within the user interface are described above with respect to FIG. 3, any of a variety of processes specific to particular head gestures and/or particular configurations of gesture reactive interface objects appropriate to the requirements of specific applications can be utilized in accordance with embodiments of the invention. Processes for modifying the size with which gesture reactive interface objects are graphically represented within a user interface in response to detection of head gestures in accordance with embodiments of the invention are discussed further below.

Modifying the Size of the Graphical Elements of Head Gesture Reactive Interface Objects In many embodiments, the manner in which a user interface is rendered can depend upon a variety of factors including (but not limited to) the type of device, the size of the display, the resolution of the display, and/or the distance of the user from the display. In several embodiments, an initial user interface configuration is determined based upon characteristics of the device including (but not limited to) the type of device, the size of the display, the resolution of the display, and/or a default set or user defined set of user interface configuration characteristics. Based upon these factors, the interface objects within the user interface can be rendered for display. In a number of embodiments, the manner in which the user interface is rendered is updated in response to the detection of a head gesture input. In certain embodiments, the detection of a head gesture input prompts the determination of the distance of the user from the display and the distance is used to modify the rendering of head gesture reactive interface objects within the user interface. In many embodiments, the size of the rendered graphical elements for each head gesture reactive interface element and/or the size of the target zone of the interface object are modified. In several embodiments, the increase in size of the rendered graphical elements and/or target zones of interface objects is not a function of distance but simply a function of the detection of a head gesture input as opposed to another input modality such as (but not limited to) a pointing device, or touch interface.

Figure 4:
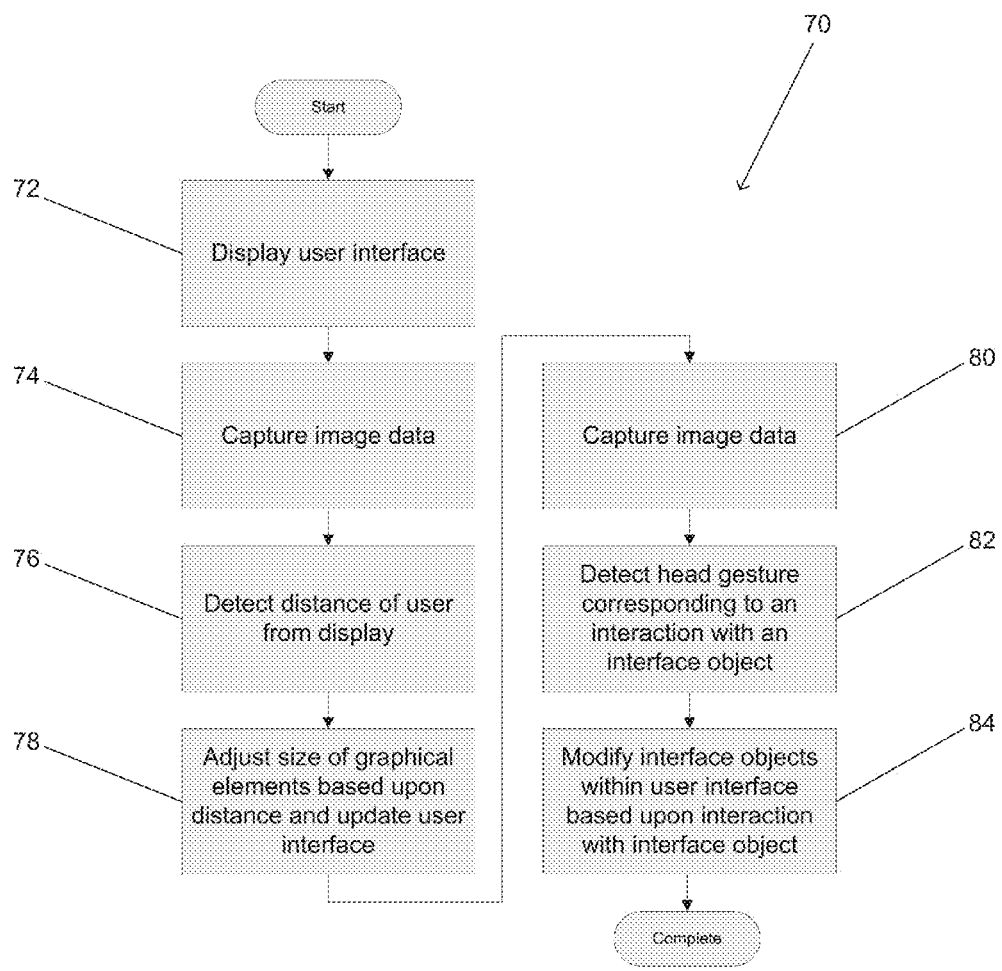
FIG. 4 is a flow chart illustrating a process for determining the size of graphical elements within a user interface based upon the distance of a user's head from a display in accordance with an embodiment of the invention.

A process for modifying the size of rendered graphical elements of gesture reactive interface objects within a user interface based upon the distance of a user from a display in accordance with an embodiment of the invention is illustrated in FIG. 4. The process 70 includes displaying (72) a user interface. As described above, the characteristics of the rendering of the initial user interface can be determined based upon a variety of factors including (but not limited to) the type of device, the size of the display, the resolution of the display, and/or a default set or user defined set of user interface configuration characteristics. Image data is captured (74). The presence of a user can be detected based upon a variety of criterion including (but not limited to) detection of a wakeup head gesture, face detection, and/or head detection. The captured image data can be utilized to determine (76) the distance of the user from the display and to adjust (78) the size of graphical elements within the rendered user interface. In a number of embodiments, the image capture system that captures image data is not collocated with the display and a configuration process can be utilized to determine the spatial relationship between the image capture system and the display. Once the distance of the user from the display is determined, the size of rendered graphical elements corresponding to head gesture reactive interface objects within the user interface. Alternatively, a management process can substitute interface objects for equivalent interface objects in which the associated graphical element has a size determined based upon the distance of the user from the display.

The process continues to capture (80) image data and head gestures corresponding to interactions with interface objects can be detected (82). Based upon the interactions, the application can modify (84) the interface objects used to render the user interface. In this way, the process 70 illustrated in FIG. 4 can be repeated to enable continuous adaptation of the size of the graphical elements within a display in response to the distance of the user from the display as the user interacts with interface objects within the user interface via head gestures.

Although the above discussion of FIG. 4 references distance of the user from a display, as can be readily appreciated the distance of a user from any of a variety of arbitrary points can be utilized as a proxy for distance from the user to the display and/or as a basis for modifying the size of the graphical elements within displayed user interface. Furthermore, embodiments of the invention are not limited to the specific process for modifying the size of graphical elements in a rendered user interface based upon detection of head gesture input illustrated in FIG. 4. Indeed, any of a variety of processes appropriate to the requirements of specific applications can be utilized to modify the size of graphical elements in a rendered user interface based upon the distance of a user to a display in accordance with embodiments of the invention.

Figure 5A:
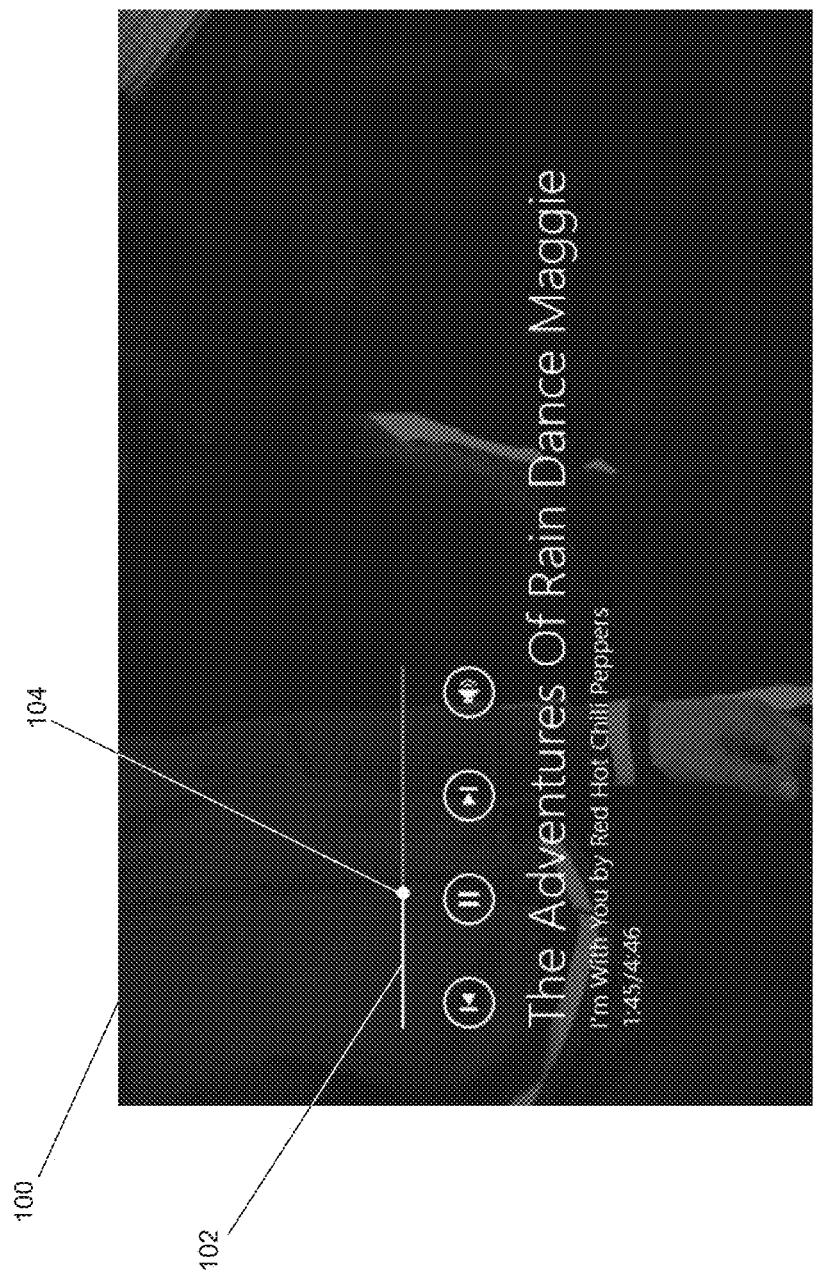
FIGS. 5A and 5B conceptually illustrate the modification of the size of graphical elements within a user interface in accordance with an embodiment of the invention.
Figure 5B:
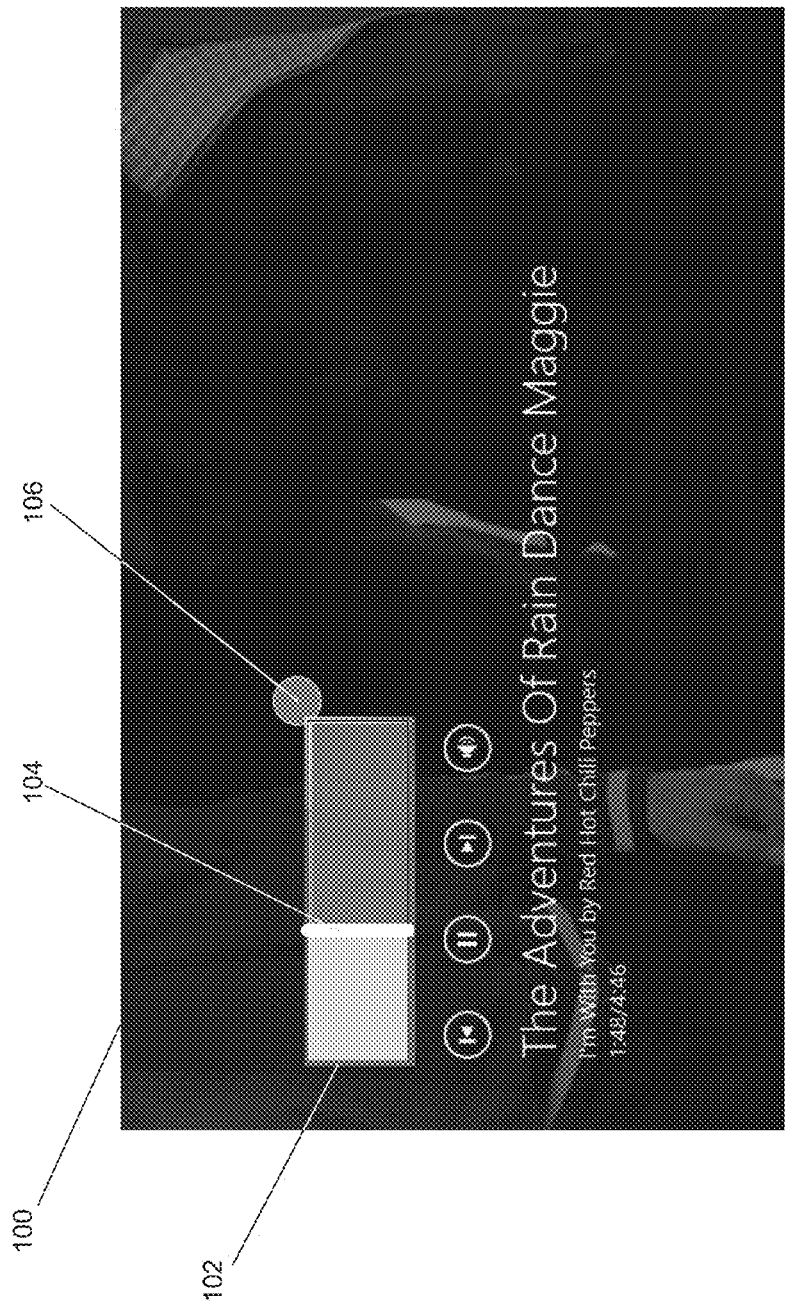

The manner in which the size of graphical elements within a rendered user interface can change in response to head gesture input in accordance with an embodiment of the invention is illustrated in FIGS. 5A and 5B. Referring to FIG. 5A, a media player user interface 100 is shown that includes a content timeline 102 and slider 104 graphical element corresponding to a timeline scrubber gesture reactive user interface element that indicates current playback location. A user can manipulate the playback location by selecting and moving the slider 104 relative to the content timeline 102. In response to receipt of input via a head gesture based input modality, and/or detection of the distance of the user from the display, the size of the content timeline 102 and the slider 104 can increase.

FIG. 5B conceptually illustrates the manner in which the sizes of graphical elements within a user interface can be increased in response to receipt of a pointing head gesture input (indicated by a cursor 106). As can be readily appreciated, the increased size of the content timeline 102 and the slider 104 graphical elements makes them easier for the user to target. As noted above, many embodiments of the invention determine the size of the displayed graphical elements based upon the distance of the user from the display. While much of the discussion above relates to determining the size of the rendered graphical elements within a user interface based upon the distance of the user from the display, the size of the rendered graphical elements may be increased simply as a function of the use of head gestures to provide input as opposed to another input modality (e.g. a pointing device or a touch interface).

In many embodiments, once the slider is targeted the user can interact with the slider via a pointing head gesture directed anywhere on the display. In this way, the target zone of the timeline scrubber gesture reactive interface object is increased in response to an initial targeting to facilitate interaction with the slider. The manner in which the target zone of an interface object can be increased to facilitate user interaction with the interface object in accordance with embodiments of the invention is discussed further below.

Modifying the Size of the Target Zone of Head Gesture Reactive Interface Objects In the same way in which the size of graphical elements within a user interface can be modified in response to head gesture input, the size of target zones of head gesture reactive interface objects within a user interface can also change based upon factors including (but not limited to) the type of device, the size of the display, the resolution of the display, and/or the distance of the user from the display. As discussed above, the initial size of the target zones of head gesture reactive interface objects within the user interface can be determined based upon a variety of factors unrelated to the user. When the presence of a user is detected, the size of the target zones can be modified based upon the distance of the user from the display to facilitate the user's interaction with interface objects within the user interface. In several embodiments, the increase in size of target zones of interface objects is not a function of distance but simply a function of the detection of head gesture input as opposed to another input modality such as (but not limited to) a pointing device, or touch interface.

Figure 6:
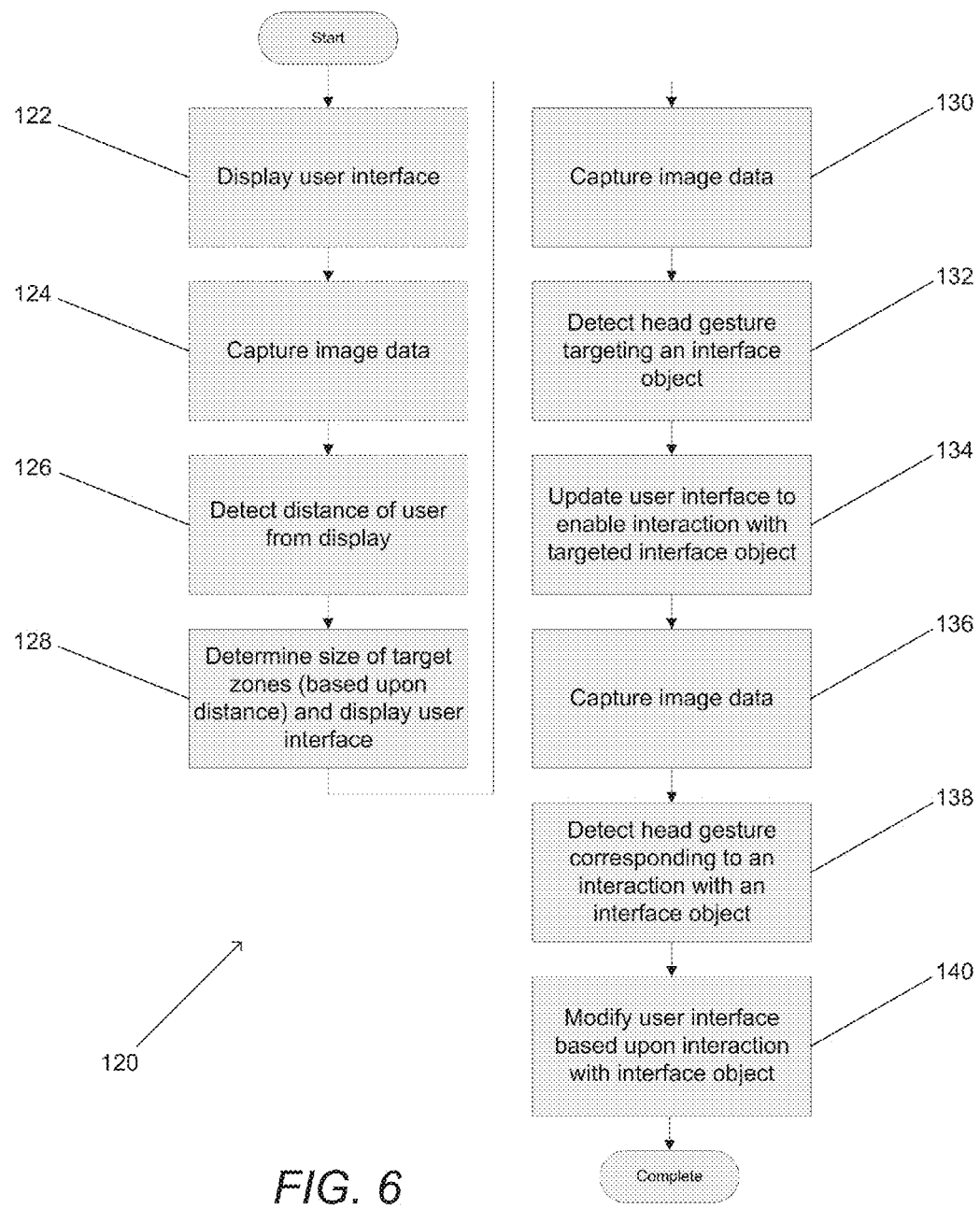
FIG. 6 is a flow chart illustrating a process for determining the size of target zones of interface objects in a user interface based upon the distance of a user's head from a display in accordance with an embodiment of the invention.

A process for determining the size of target zones for interface objects within a user interface based upon the distance of a user from a display and receiving head gesture based input involving interactions with interface objects within the target zones in accordance with an embodiment of the invention is illustrated in FIG. 6. The process 120 optionally includes displaying (122) a user interface, capturing image data (124) and determining (126) the distance of the user from the display in a similar manner to that described above with respect to FIG. 4. As can readily be appreciated, the distance of a user from a display may only need to be performed once or infrequently during a head gesture based interactive session. Where the optional portions of the process 120 are performed, the distance of the user from the display is used to adjust (128) the size of the target zones of head gesture reactive interface objects within the user interface. Alternatively, receipt of input via head gesture (as opposed to via another input modality) can cause the user interface to increase (128) the size of the target zones of interface elements within the user interface to facilitate user interaction via head gesture.

The process continues to capture (130) image data so that head gestures targeting interface objects can be detected (132). The targeting of an interface object typically does not constitute an interaction with the interface object. Rather the targeting of the interface object can enable or unlock the capability of a user to interact with the interface object. Accordingly, the user interface can be (optionally) updated (134) based upon the characteristics of the targeted interface object in any of a variety of manners including (but not limited to) the techniques described below for facilitating interaction with the targeted interface object. In several embodiments, the updating of the user interface can be as simple as displaying a graphical element corresponding to the target zone for the targeted interface object and/or highlighting the graphical element of the targeted interface object. In many embodiments, the targeting of a head gesture reactive interface object may unlock the ability for the user to interact with the interface object using one or more 3D gestures.

As an interface object is targeted (132), the process continues capturing (136) image date and can detect (138) a head gesture corresponding to an interaction with the targeted interface object. Based upon the interactions, the application can modify (140) the interface objects used to render the user interface. In this way, the process 120 illustrated in FIG. 6 can be repeated to enable continuous adaptation of the size of the target zones of interface objects within a user interface in response to the distance of the user from the display as the user interacts with interface objects within the user interface via head gestures.

Although the above discussion of FIG. 6 references distance of the user from a display, as can be readily appreciated the distance of a user from any of a variety of arbitrary points can be utilized as a proxy for distance from the user to the display and/or as a basis for modifying the size of the graphical elements within displayed user interface. Furthermore, embodiments of the invention are not limited to the specific process for modifying the size of target zones of interface objects within a user interface based upon the distance of a user to a display illustrated in FIG. 6. Indeed, any of a variety of processes appropriate to the requirements of specific applications can be utilized to modify the size of target zones of interface objects within a user interface in accordance with embodiments of the invention.

Figure 7A:
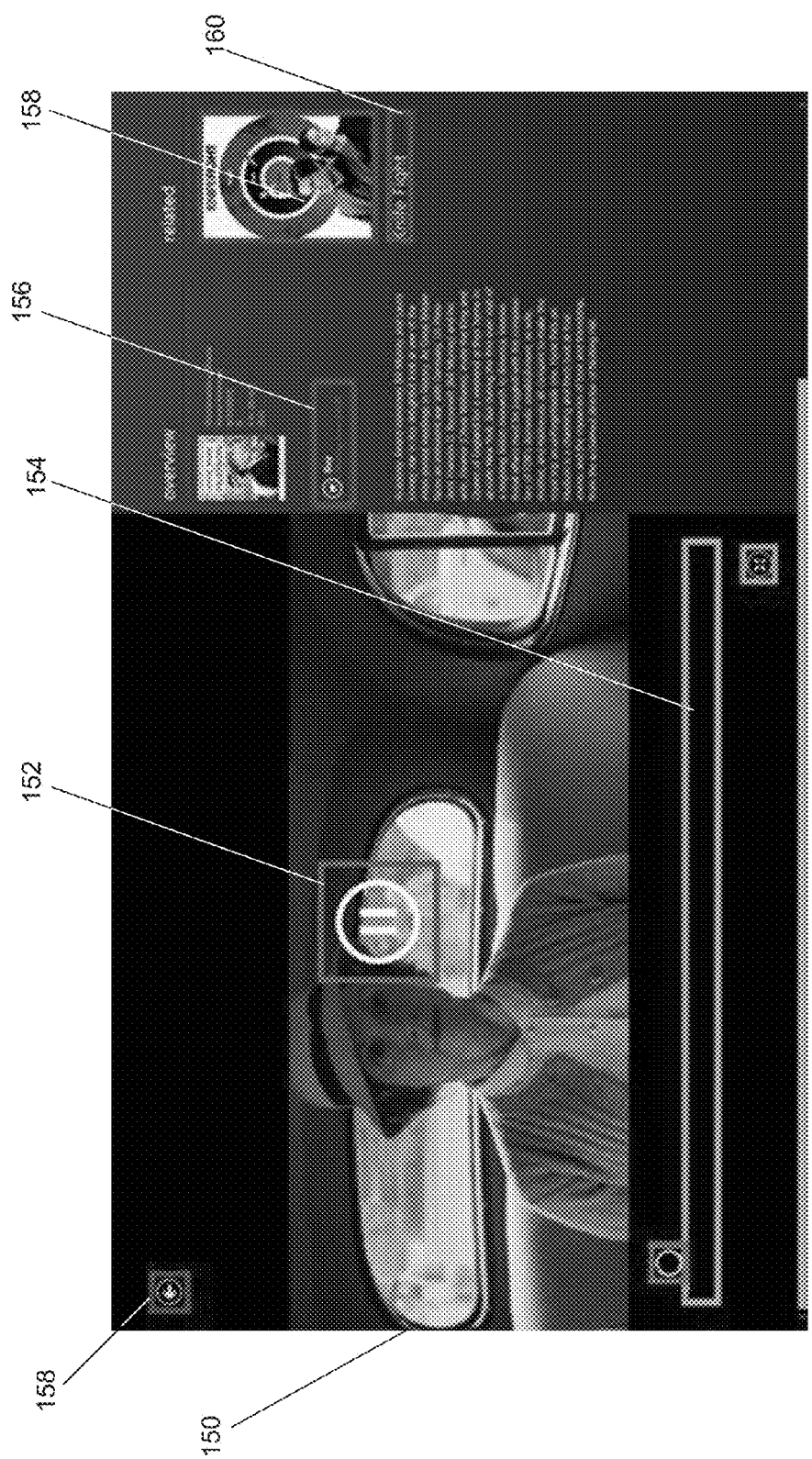
FIGS. 7A and 7B conceptually illustrate the modification of graphical elements indicating target zones of interface objects within a user's interface in accordance with an embodiment of the invention.
Figure 7B:
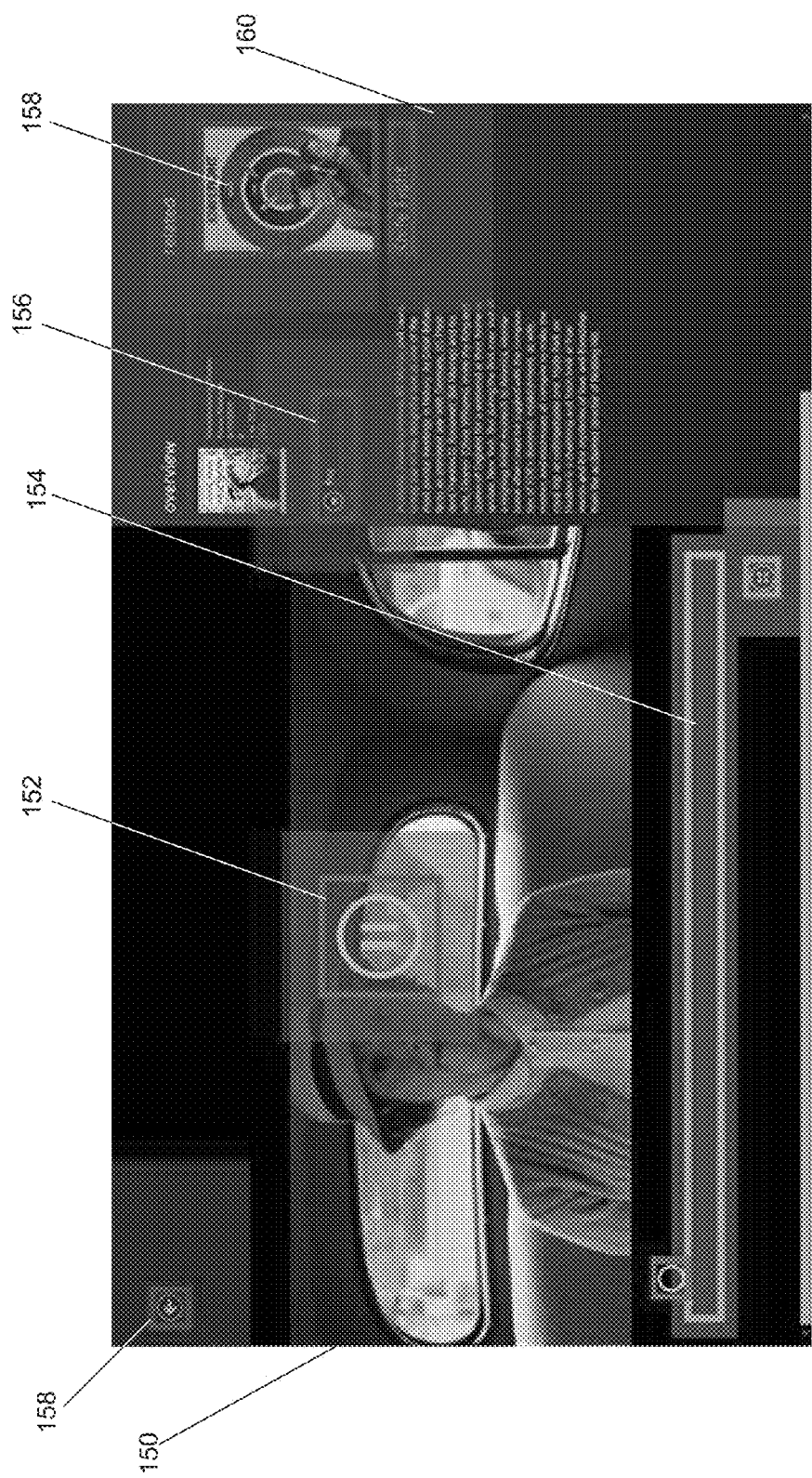

The manner in which the size of target zones within a rendered user interface can change in response to head gesture input in accordance with an embodiment of the invention is illustrated in FIGS. 7A and 7B. In the illustrated embodiment, the target zones are indicated within the user interface using graphical elements that communicate to the user when the user is targeting an interface object. In other embodiments, a graphical element corresponding to the target zone for an interface element is only rendered when the user approaches and/or encroaches upon the target zone. With specific reference to FIG. 7A, a display 150 including a number of head gesture reactive interface objects (152, 154, 156, 158, 160) with which a user can interact are shown. Upon detection of the commencement of head gesture based interaction with the user interface, the size of the target zones for the interface objects can be determined and or displayed. In FIG. 7B, the sizes of the target zones of the interface elements (152, 154, 156, 158, 160) within the user interface are indicated using corresponding transparent graphical elements. When the system detects a pointing head gesture, such as, but not limited to staring at a particular portion of the display that is pointing at one of the target zones, the user can provide additional head gesture inputs to interact with the targeted interface object. In alternative embodiments, a graphical element indicating the size of a target zone for an interface element is only displayed when the user approaches within a predetermined threshold distance from the edge of a target zone and/or when the uses encroaches on the target zone of an interface object. In several embodiments, the target zones are not displayed and the user interface simply highlights the graphical element of the interface object when the user performs a pointing head gesture directed toward the target zone of the interface object. While much of the discussion above relates to determining the size of the target zones based upon the distance of the user from the display, the size of the target zones may be increased as a function of the use of head gestures to provide input as opposed to another input modality (e.g. a pointing device or a touch interface).

Simplifying Interaction with Targeted Interface Objects

Users are typically much less precise with targeting a pointing head gesture than they are with providing touch inputs and/or using pointing devices. Systems in accordance with many embodiments of the invention can modify the characteristics of interface objects targeted by head gestures to simplify user interaction with the targeted interface objects. In many embodiments, the user interface responds to the targeting of a head gesture reactive interface object by automatically increasing the size of the rendered graphical element of the interface object and/or a group or layout of related interface objects within the user interface. Increasing the size of an interface object and/or a group or layout of related interface objects can assist the user in targeting a specific interface object of interest. In a number of embodiments, the user interface changes the manner in which head gestures are mapped to locations on the display to slow the movement of a cursor in response to the initial targeting of an interface object. In this way, it is easier for a user to continue targeting an interface object for a sufficient period of time to enable the user to interact with the interface object and/or confirm the user's intention to interact with the interface object.

Figure 8:
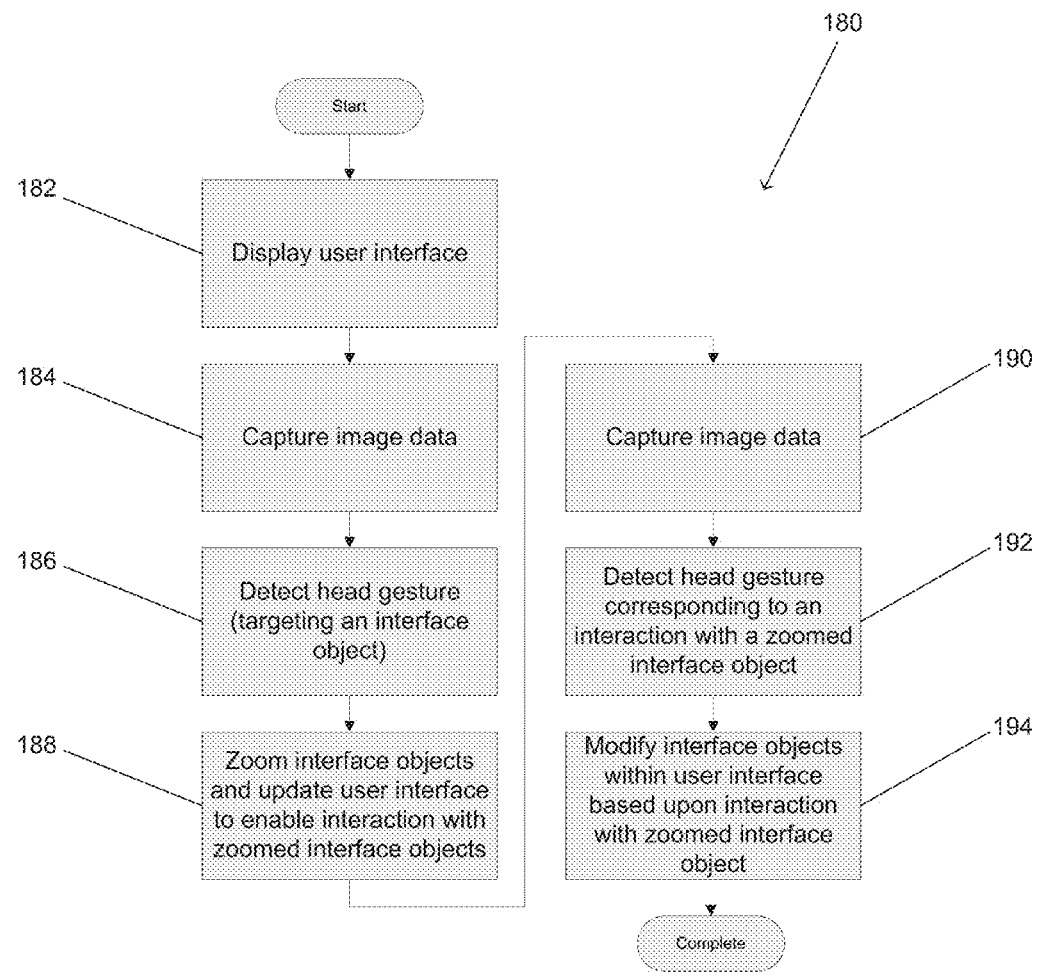
FIG. 8 is a flow chart illustrating a process for zooming interface objects based upon the targeting of one of the interface objects via a head gesture in accordance with an embodiment of the invention.

A process for increasing the size of rendered graphical elements of gesture reactive interface objects within a user interface in response to targeting of an interface object using a head gesture input in accordance with an embodiment of the invention is illustrated in FIG. 8. The process 180 includes displaying (182) a user interface that may include one or more head gesture reactive interface objects, and capturing image data (184). The captured image data can be utilized to detect (186) a head gesture targeting an interface object. In several embodiments, the size of the rendered graphical element of the targeted interface object is increased or "zoomed" (188). In many embodiments, the user interface includes metadata that identifies groups or layouts containing related interface objects and the targeting of an interface object causes the zooming of the group of related interface elements and/or the layout containing the group of related interface objects. The process continues (190) to capture image data to detect (192) a head gesture corresponding to an interaction with a zoomed interface object. Based upon the interactions, the application can modify (192) the interface objects used to render the user interface. In this way, the process 180 illustrated in FIG. 8 can be repeated to enable continuous zooming of interface objects within a user interface in response to targeting of interface objects via head gestures.

Although the above discussion of FIG. 8 references zooming interface objects, as can be readily appreciated other techniques for simplifying a user's head gesture based interaction with a targeted interface object can be utilized including (but not limited to) slowing or damping head gesture input in response to the targeting of an interface object to facilitate the continued targeting of and/or interaction with the interface object. This can be achieved by temporarily changing the mapping between the 3D interaction zone in which a user can provide head gesture input and the display. Furthermore, embodiments of the invention are not limited to the specific process for updating a user interface in response to the targeting of an interface object via a head gesture illustrated in FIG. 8. Indeed, any of a variety of processes appropriate to the requirements of specific applications can be utilized to update a user interface in response to the targeting of an interface object via a head gesture in accordance with embodiments of the invention.

Figure 9A:
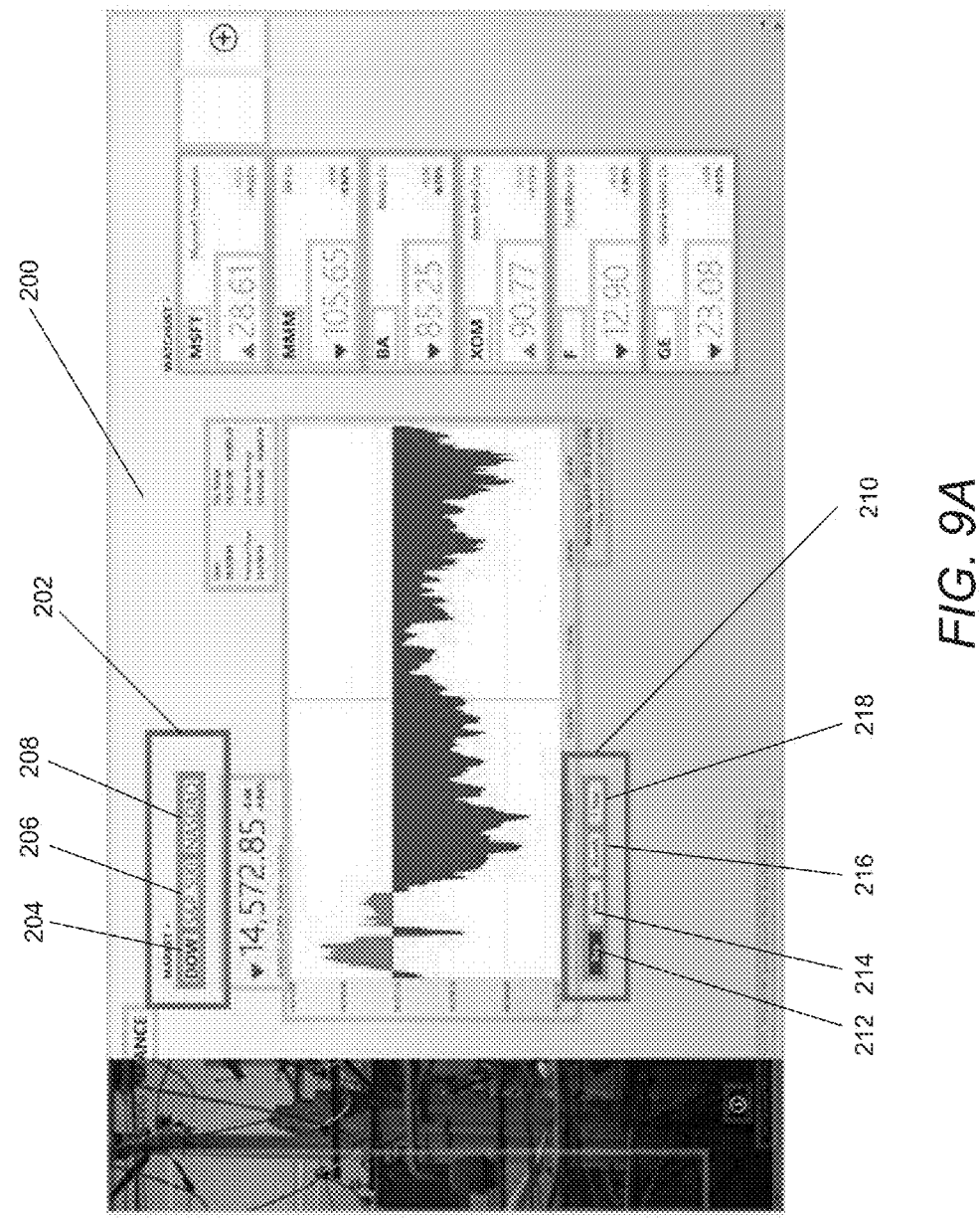
FIGS. 9A and 9B conceptually illustrate the zooming of interface objects based upon the targeting of one of the interface objects via a head gesture in accordance with an embodiment of the invention.
Figure 9B:
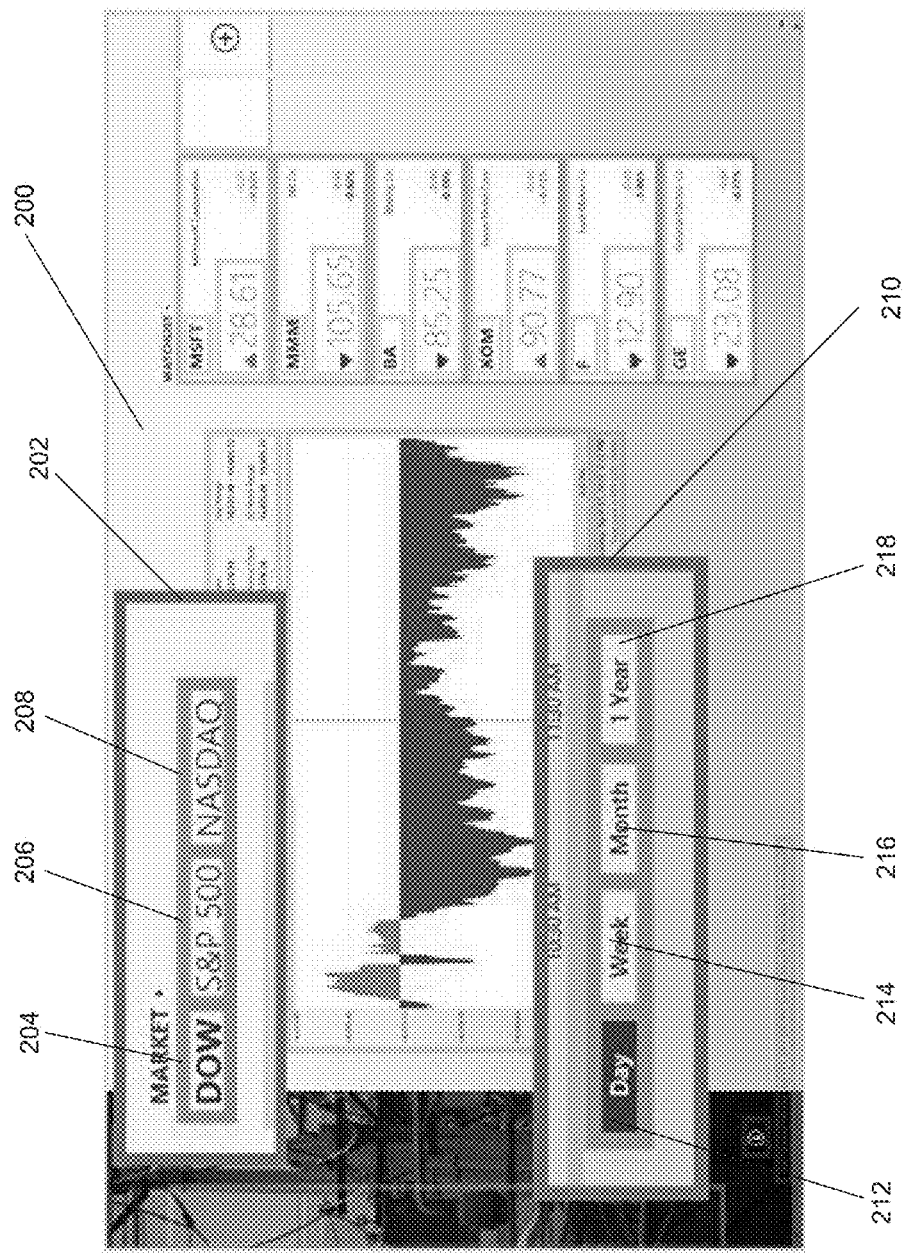

The updating of a user interface in response to the targeting of an interface object via a 3D gesture is illustrated in FIGS. 9A and 9B. In the illustrated embodiment, targeting of the target zone of an interface object within a layout causes the zooming of the entire layout to facilitate interaction with individual interface objects within the layout. Referring to FIG. 9A, a display 200 including stock ticker information is illustrated. The display includes a first group of interface elements 202 enabling the user to select between the display of the three stock indices (204, 206, and 208). A second group of interface elements 210 specifies the time period displayed (212, 214, 216, and 218). A head gesture that targets either the first or second group of interface objects causes the zooming of both groups of interface objects. The zooming of the groups of interface objects is illustrated in FIG. 9B. In a number of embodiments, the zooming persists for a predetermined period of time deemed sufficient to enable the user to interact with one of the interface objects. In this way, head movements that result in the user leaving the target zone does not result in the reduction in the size of the rendered graphical elements. As can readily be appreciated, the zooming can be accompanied by a slowing or damping of the head gesture input within the zoomed regions of the user interface to allow the user greater control over the targeting of interactions with individual interface objects. While much of the discussion above relates to facilitating interaction with targeted interface objects and/or groups or layouts or related interface objects, many embodiments perform zooming of interface objects in response to the detection of head gesture input (as opposed to another input modality) and irrespective of whether the user is targeting one of the interface objects or groups of interface objects. In this way, the graphical elements of interface objects can be rendered in a manner that is more suited to head gesture based interaction in response to the user initiating a head gesture based interactive system with the user interface. Furthermore, in several embodiments zooming is not automated but is initiated via a zooming interaction with an interface object. Examples of head gestures that can be utilized to perform zooming interactions include (but are not limited to) pushing on the target zone of an interface object.

Interacting with Head Gesture Reactive Interface Objects

Many of the techniques described above simplify the ability of a user to target a specific interface object within a user interface when providing input via head gestures. The use of head gesture reactive interface objects in accordance with many embodiments of the invention can also simplify the process of interacting with a targeted interface object. In many embodiments, an initial targeting of an interface object can unlock the ability of the user to interact with the targeted interface object via one or more predetermined head gestures. Furthermore, the head gestures used to interact with the interface object need not require a pointing action toward the target zone of the interface object. Where continued pointing is required to interact with the interface object, techniques to simplify the interaction can be utilized including (but not limited to) increasing the size of the target zone of the interface object after an initial period of targeting to reduce the fatigue associated with attempting to point accurately at the display for an extended period of time. A benefit of using a two-step process to interact with interface objects is that unintended head gestures/interactions (i.e. user behavior that unintentionally involves performing a head gesture triggering an interaction with an interface object) can be reduced. A user is made aware of the inadvertent targeting of an interface object and can perform a cancelation head gesture or simply wait for the targeting of the interface object to expire in order to avoid performing an interaction and to continue interacting with the user interface. As can readily be appreciated, users can interact with interface objects in a variety of ways. Techniques for selecting, and scrolling interface objects in accordance with embodiments of the invention are described below. However, the processes and techniques described herein can be extended to any form of interaction with an interface object such as (but not limited to) zooming the interface object.

Selecting Interface Objects

In many applications, benefits can be derived by enabling the user to initiate interaction with a gesture reactive interface object using a first head gesture such as, but not limited to staring at the interface object and then enabling the user to continue the interaction with a second head gesture such as, not limited to nodding the head. For example, a user can stare at the target zone of an interface object for a predetermined period of time to select the object and make a second head gesture to select the object such as (but not limited to) a head nodding gesture involving lowering and raising the head. Allowing the user to relax his head prior to performing the second gesture can minimize fatigue associated with staring at a particular portion of the display. In many embodiments, the user interface provides visual feedback during the selection process to indicate that the initial head gesture has been detected and that a user may perform a second head gesture to complete the selection and/or a visual indication of the time available for the user to complete the second head gesture to complete the selection. In several embodiments, the user is able to pause for an unconstrained period of time between the initiation of the selection process and performing the second head gesture to complete the selection process. In the event that the user decides not to complete the selection process, the user can simply continue interacting with the GUI by pointing at other interface objects. In certain embodiments, the initial process of targeting an interface object can incorporate hysteresis to disregard extra head movements that briefly cause a cessation in targeting.

Figure 10:
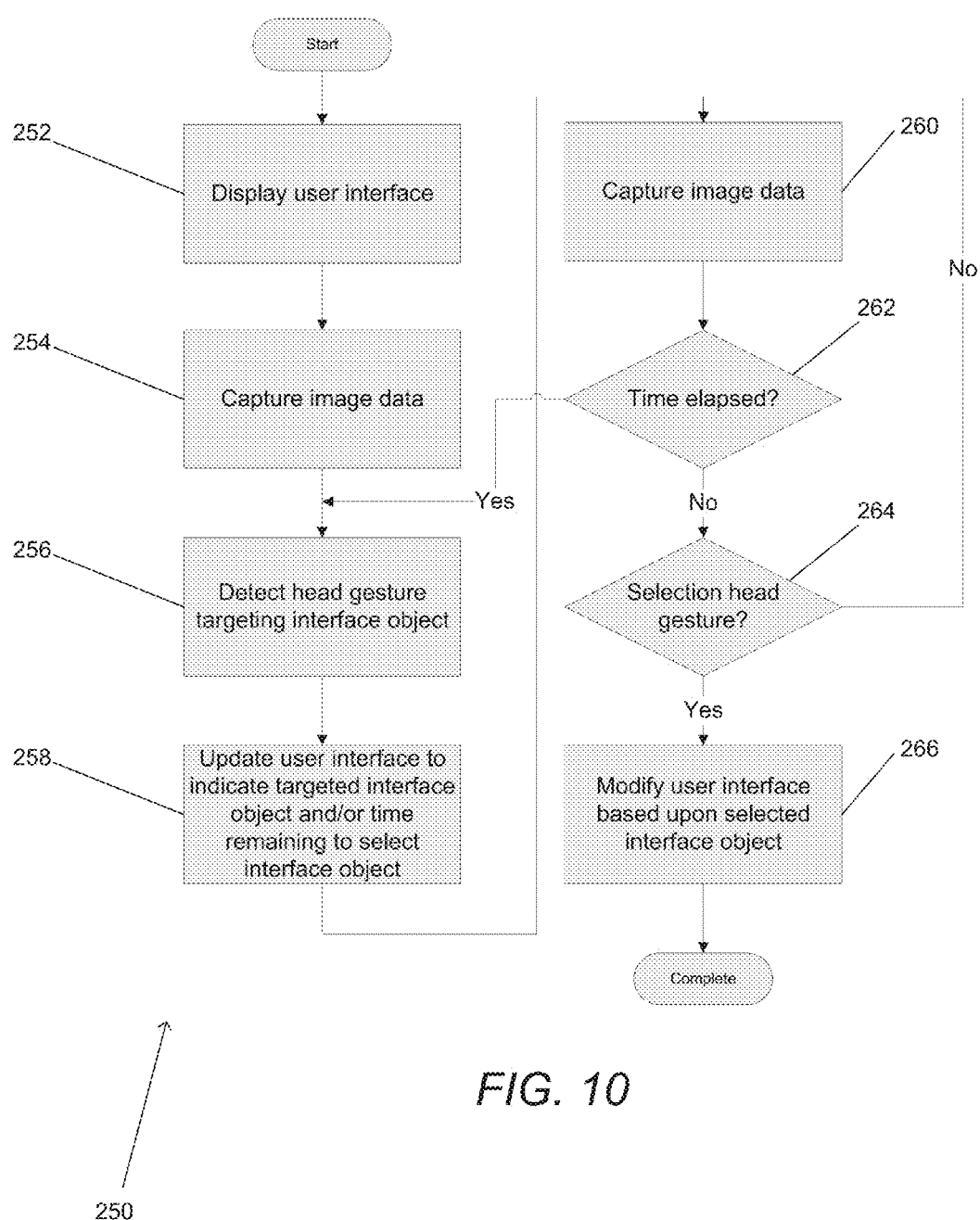
FIG. 10 is a flow chart illustrating a process for detecting a head gesture targeting an interface object, updating the user interface to provide a notification that the targeted interface object is selectable and/or the period of time remaining in which the targeted interface object can be selected via a second head gesture, and detecting a head gesture selecting the interface object in accordance with an embodiment of the invention.

A process for detecting a head gesture targeting an interface object, modifying the user interface to provide a notification that the targeted interface object is selectable and/or the period of time remaining in which the interface object can be selected via a second head gesture, and detecting a head gesture selecting the interface object in accordance with an embodiment of the invention is illustrated in FIG. 10. The process 250 includes displaying (252) a user interface, capturing (254) image data and detecting (256) targeting of an interface object within the user interface using a pointing 3D gesture that persists for a predetermined period of time. As noted above, the process of determining whether the head gesture persists for a predetermined period of time may include hysteresis to account for tremors that reduce the accuracy with which a user can point via head gesture at an interface object for an extended period of time.

The process updates (258) the user interface to provide visual feedback that the targeted interface object is now capable of selection. The visual feedback can include highlighting the interface object. In several embodiments, the user interface also displays the time remaining for the user to select the interface object. At which point, the targeted interface object can now be selected via a second selection head gesture that need not involve continued staring at the interface object. Examples of gestures that can be used to select a targeted interface object include (but are not limited to) a nodding gesture (moving the head up and down and a blinking gesture (opening and closing of the eyes). As can readily be appreciated different head gestures including different motions and/or different head gestures including similar motions but incorporating different numbers of movements can be utilized to select and/or interact with interface objects in different ways.

In order to detect the selection of the targeted interface object, the process 250 captures (260) image data for a predetermined period of time (262) to determine (264) whether the user has performed a selection head gesture. In many embodiments, the process supports the cancellation of the targeting of an interface object by performing a cancelation head gesture to terminate the targeting of the interface object. Based upon the selected interface object, the application can modify (266) the interface objects used to render the user interface. In this way, the process 250 illustrated in FIG. 10 can be repeated to enable continuous selection of interface objects within a user interface via head gestures.

Although the above discussion of FIG. 10 references selection of interface objects, as can be readily appreciated other types of interactions with interface objects can be performed by targeting an interface object with a targeting head gesture for a first predetermined period of time and then performing a second interaction head gesture within a second predetermined period of time. Furthermore, embodiments of the invention are not limited to the specific process for selecting an interface object via a sequence of head gestures illustrated in FIG. 10. Indeed, any of a variety of processes appropriate to the requirements of specific applications can be utilized to select an interface object using a sequence of two or more 3D gestures in accordance with embodiments of the invention.

Figure 11A:
FIGS. 11A, 11B & 11C conceptually illustrate selection of a gesture reactive interface object within a user interface by targeting the interface object with a first targeting head gesture and selecting the interface object using a second selection head gesture in accordance with an embodiment of the invention.
Figure 11B:
Figure 11C:
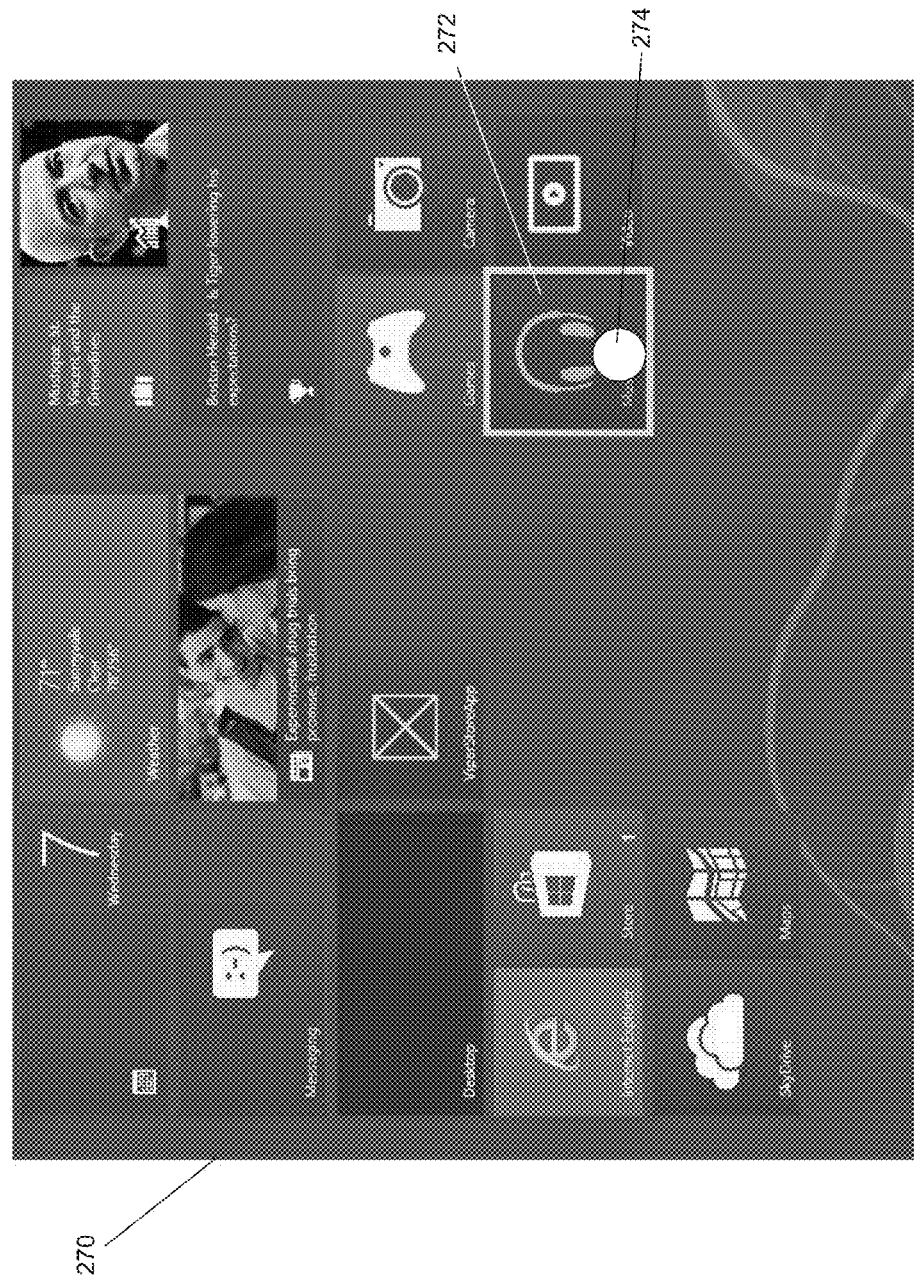

The selection of a head gesture reactive interface object via head gesture input in accordance with an embodiment of the invention is illustrated in FIGS. 11A, 11B, and 11C. Referring first to FIG. 11A, a Windows 8 user interface 270 is displayed including a plurality of interface objects, one of which includes a tile graphical element 272 enabling launching of a media player application. In the illustrated embodiment, the user interface receives input via a head gesture based input modality. Specifically, the user input is shown receiving a pointing head gesture, the receipt of which is indicated by the display of a cursor 274 within the user interface. The user can target an interface object by moving the cursor into the target zone of the interface object using a pointing head gesture and holding the cursor within the target zone for a predetermined period of time (allowing for some hysteresis). Once the interface object is targeted, the user can interact with the targeted interface object using a second head gesture that can potentially be different to the targeting gesture and that need not occur within the initial target zone of the interface object.

The targeting of the tile 272 associated with an interface object that can launch a media player is shown in FIG. 11B. In order to provide visual feedback that the user has successfully targeted the relevant interface object, the cursor 274 changes from a transparent disc to a solid disk. In other embodiments, any of a variety of techniques can be utilized to provide visual feedback that an interface object is targeted including allowing the user to select between different cursor graphical elements corresponding to the states of no interface object targeted and interface object targeted. In many embodiments, the ability of the user to interact with the interface object within a predetermined period of time is also indicated using the cursor. In the illustrated embodiment, the cursor includes a band 276 that indicates the time remaining 278 in which a head gesture input can be provided in order to interact with the targeted interface object. When the predetermined time period expires, the band completely changes color and the cursor can revert back to the graphical element used to indicate that no interface object is targeted. If a cancelation head gesture is received, then the targeting of the interface object is terminated. If an interaction head gesture is received, then the user interface can provide visual feedback that the user successfully provided the command to interact with the interface object and updates the user interface based upon the interaction.

The selection of the tile 272 using a selection head gesture, which corresponds to a direction to launch a media player application, is illustrated in FIG. 11C. The cursor 274 is a solid white color to indicate that the user has selected the targeted interface object. While the cursor 274 is shown overlaid on the tile 272 corresponding to the selected interface object, the user can allow the cursor to move outside the initial target zone of the interface object to perform the selection head gesture. In this way, the fatigue associated with continuous staring can be reduced and/or selection head gestures that do not have a pointing or directional component can be utilized to provide head gesture input. Although specific visual feedback mechanisms and user interfaces are illustrated in FIGS. 11A-11C, any of a variety of visual feedback mechanism, cursor graphical elements, and user interfaces can be utilized to enable the targeting of an interface object using a first head gesture and interaction with the targeted interface object using a second head gesture in accordance with embodiments of the invention.

Interacting with Affordances

User interfaces in accordance with several embodiments of the invention can include gesture reactive interaction elements that are affordances showing target zones where a user may interact with the user interface via 3D gesture. The use of gesture reactive interaction elements to facilitate scrolling via head gesture in accordance with an embodiment of the invention is conceptually illustrated in FIGS. 12A and 12B. In the illustrated embodiment, the extent of the user interface 270 is much greater than the portion of the rendered user interface displayed 272 to the user. In order to inform the user of the ability to scroll the portion of the user interface that is displayed and to enable the user to perform the scrolling action, the user interface includes two gesture reactive interface elements (274, 276) that are rendered as affordances with respect to scrolling actions. Referring to FIG. 12B, the targeting of the affordance 274 by a staring gesture results in leftward scrolling of the displayed user interface from a first position 272 to a second position 278.

Figure 12A:
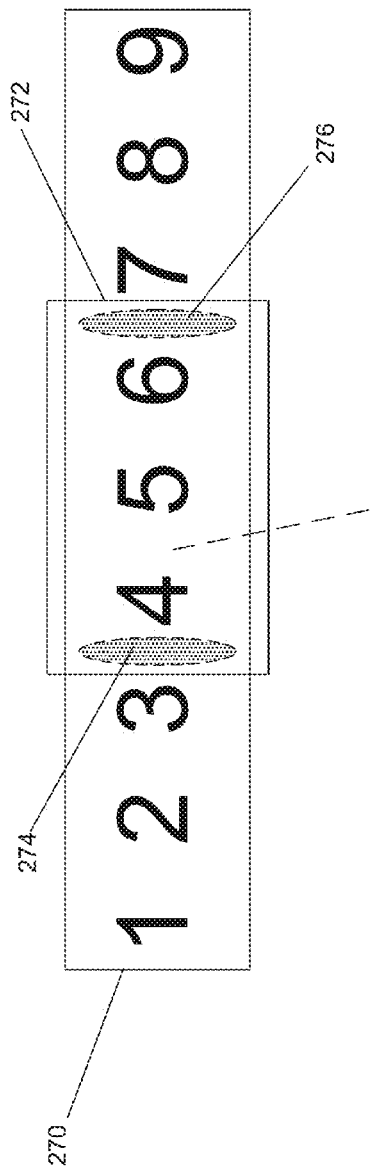
FIGS. 12A and 12B conceptually illustrate the process of scrolling within a user interface.
Figure 12B:
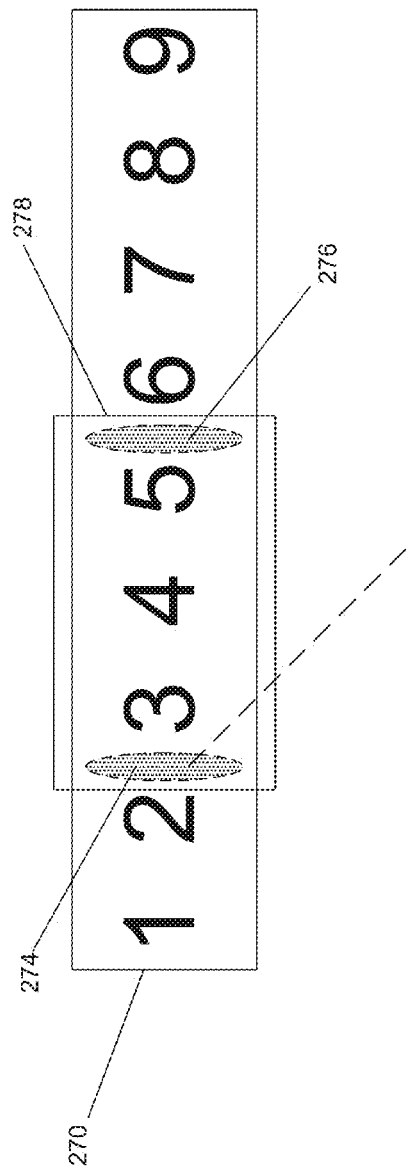

The process illustrated in FIGS. 12A and 12B is relatively simple and can be expanded upon to facilitate the ability of a user to initiate actions via the user interface. In many embodiments, the size of a gesture reactive interaction element can increase once a user starts interacting with the interactive element. In this way, the user can relax the accuracy with which the user is staring at the display. In several embodiments, a user's interaction with a head gesture reactive interaction element increases the size of the target zone of the interaction element (i.e. the target zone increases in size even though the graphical representation of the interaction element on screen remains the same size) to achieve a similar effect without modification of the display.

Figure 13:
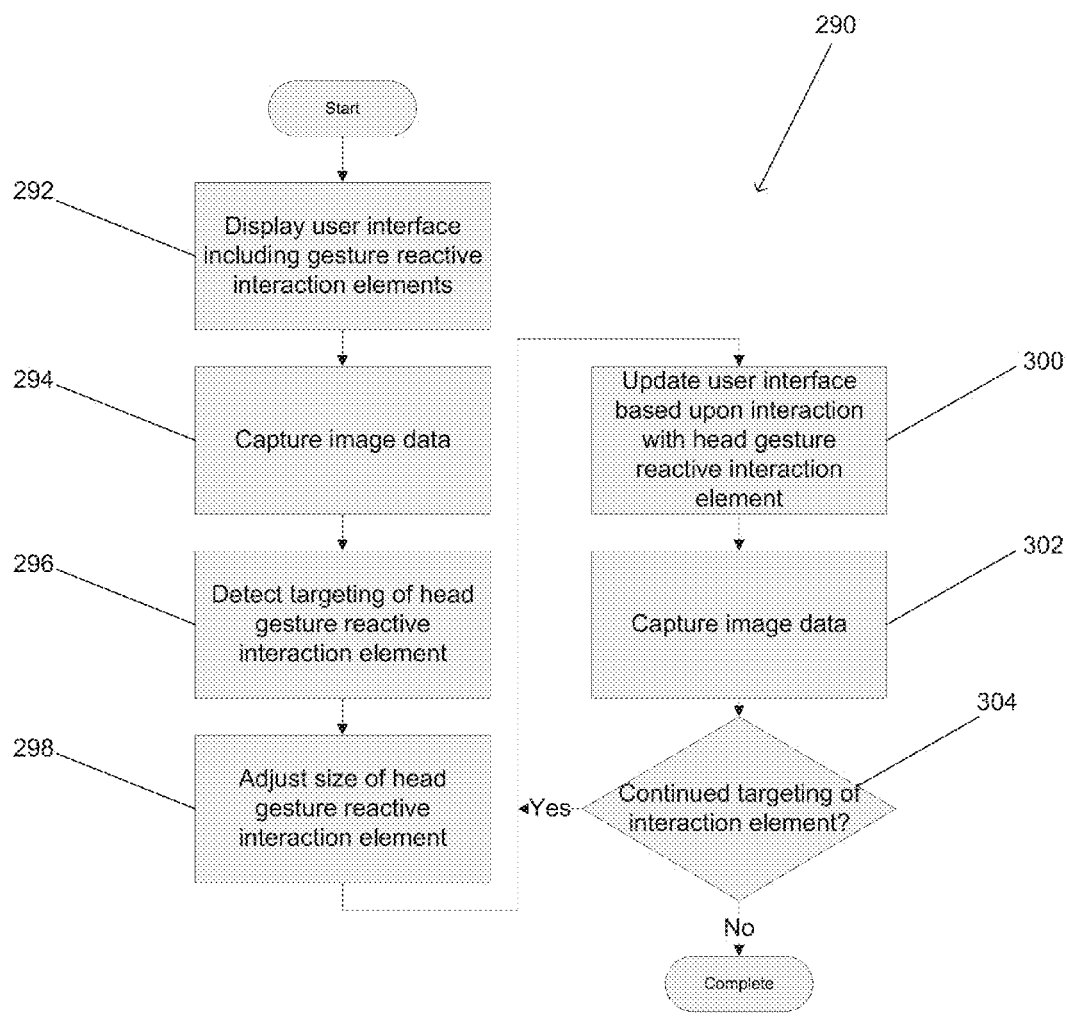
FIG. 13 is a flow chart illustrating a process for displaying interface elements that indicate target zones for performing scrolling interactions via a head gesture, where the interface elements increase in size in response to targeting by a head gesture, in accordance with an embodiment of the invention.

A process for targeting an affordance within a user interface using a first head gesture in accordance with an embodiment of the invention is illustrated in FIG. 13. The process 290 includes displaying (292) a user interface including head gesture reactive interaction elements and capturing image data (294) to detect (296) a head gesture targeting a gesture reactive interaction element. When a head gesture targeting a head gesture reactive interaction element is detected, the size of the head gesture reactive interface is increased (298) and the user interface is updated (300) based upon the action initiated by the user's targeting of the affordance. The process 290 continues to capture (302) image data and the user interface continues to update in response to the continued targeting (264) of the interaction element. In several embodiments, the processes of detecting continued targeting includes hysteresis to prevent the termination of an action in response to small head movements that briefly cause the user to cease targeting the target zone of the interaction element.

Although the above discussion of FIG. 13 references increasing the size of rendered graphical elements corresponding to interaction elements within a user interface in response to targeting by a head gesture, a similar effect can be obtained by increasing the target zone of the interaction element. Furthermore, embodiments of the invention are not limited to the specific process for modifying a user interface in response to the targeting of an interaction element via a head gesture illustrated in FIG. 13. Indeed, any of a variety of processes appropriate to the requirements of specific applications can be utilized to modify a user interface in response to the targeting of an interaction element via a head gesture in accordance with embodiments of the invention.

Figure 14A:
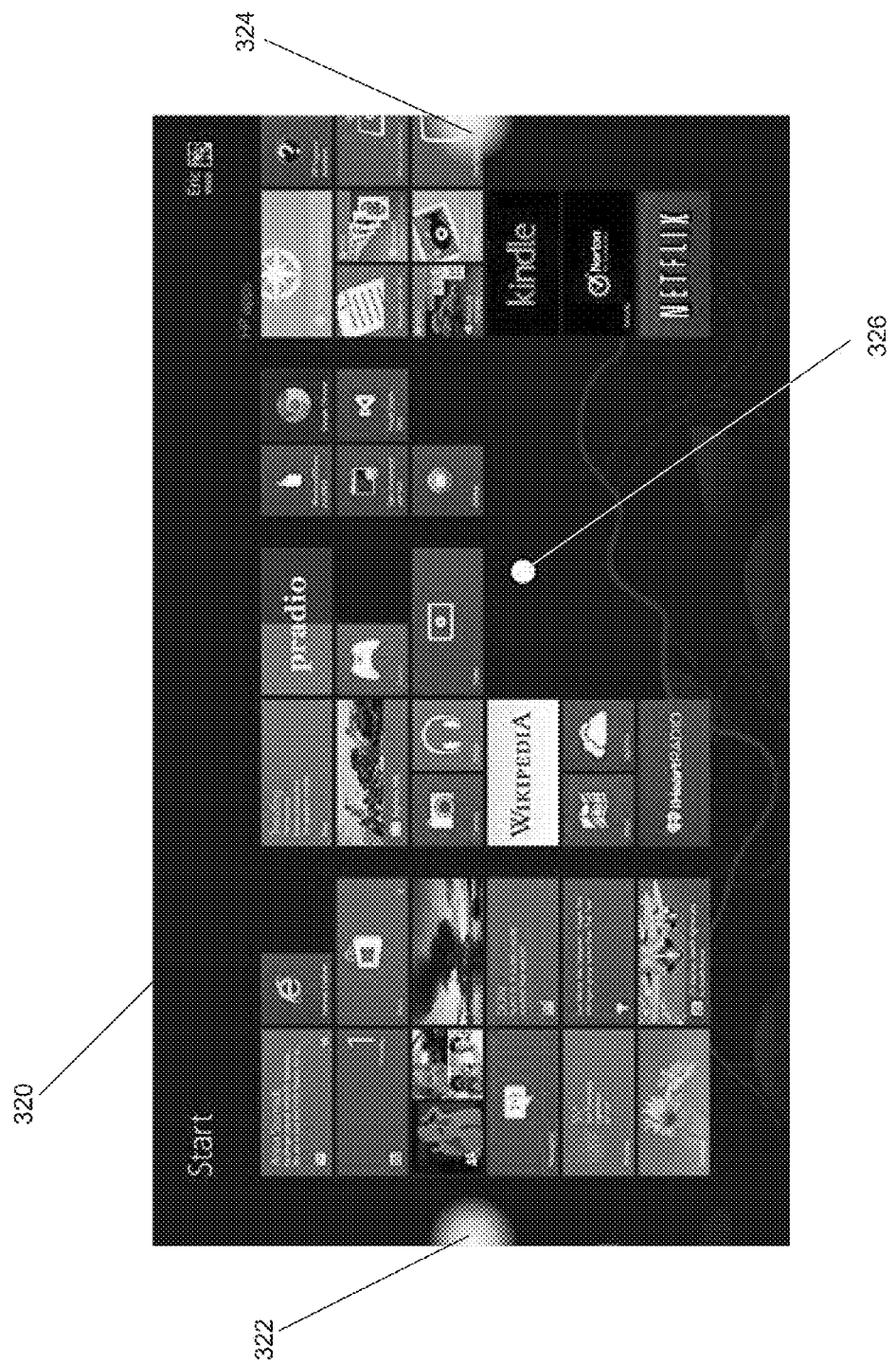
FIGS. 14A and 14B conceptually illustrate the modification of a user interface to increase the size of interface elements when the interface elements are targeted via a head gesture in accordance with an embodiment of the invention.
Figure 14B:
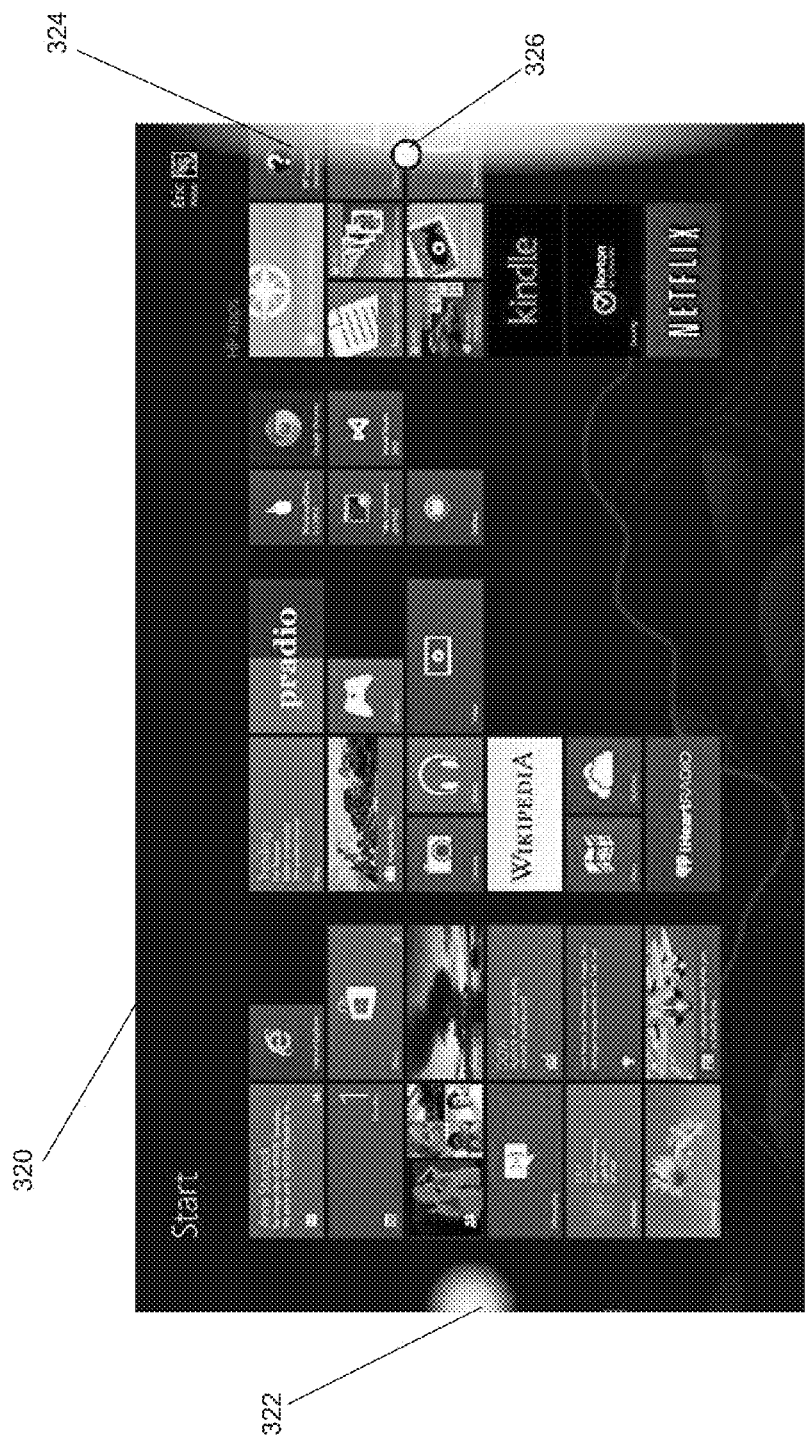

The modification of a user interface to increase the size of rendered graphical elements of an interaction element in response to the targeting of the interaction element via a head gesture is illustrated in FIGS. 14A and 14B. In the illustrated embodiment, the user interface includes affordances and targeting of the target zone of an interaction element causes an increase in the size of the affordance. Referring to FIG. 14A, a Windows 8 start display 320 including scrolling affordances is illustrated. The display includes a first scrolling affordance 322 enabling the user to scroll the user interface from the left to the right and a second scrolling affordance 324 enabling the user to scroll the user interface from the right to the left. In other embodiments, the direction of scrolling can be reversed. In addition to the affordance interaction elements, the user interface includes a cursor 326 indicating the location on the display currently targeted by a staring head gesture input provided by a user. Referring to FIG. 14B, a head gesture that targets the first affordance 322 (as indicated by the cursor 326 location) causes the user interface to increase the size of the affordance to facilitate the continued targeting of the affordance.

Figure 15A:
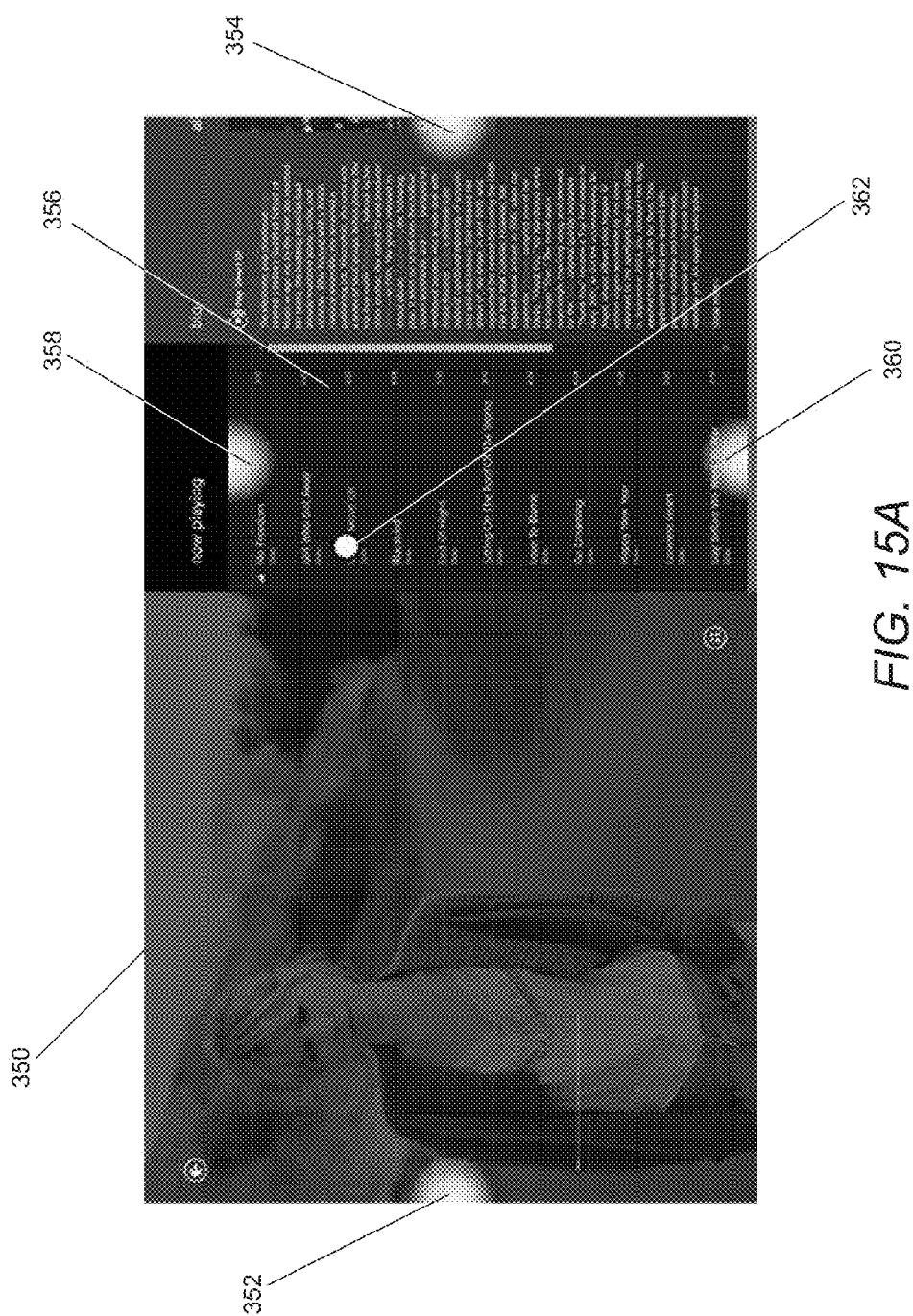
Figure 16:
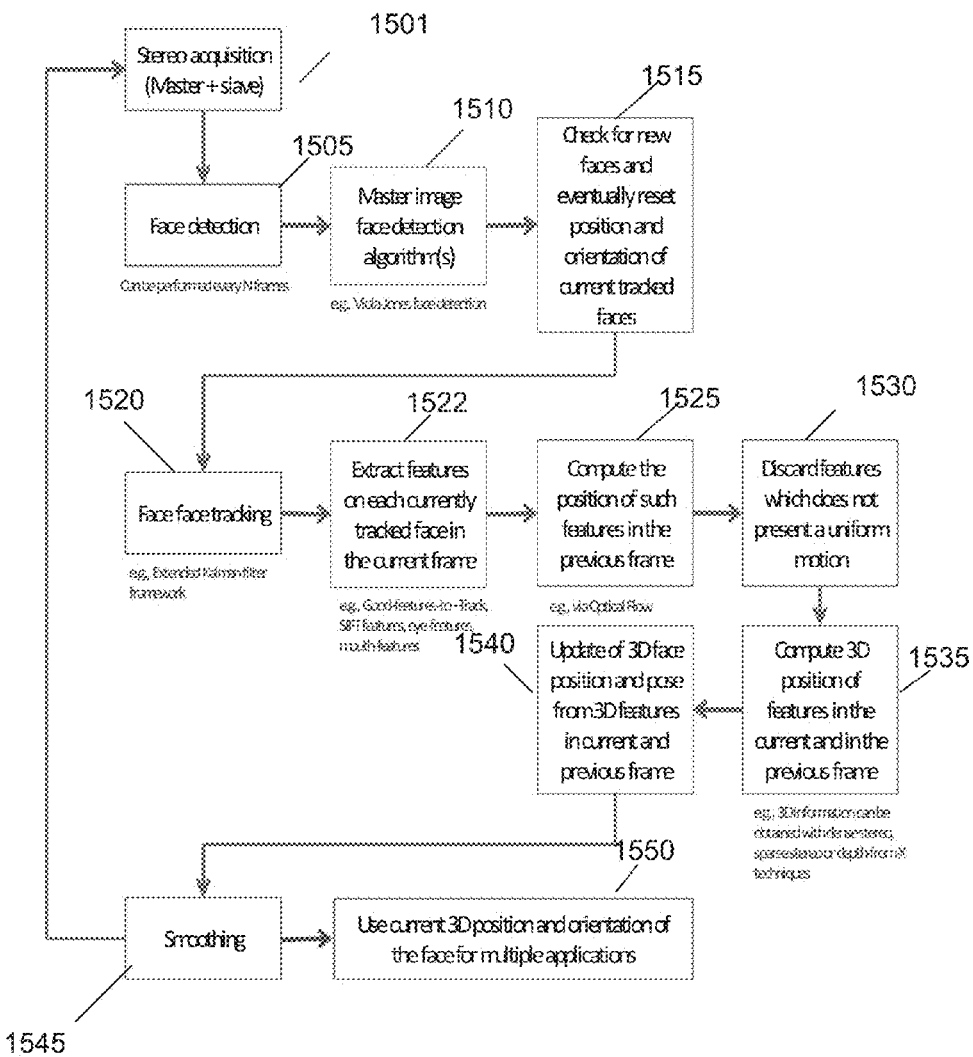
FIG. 16 is a flow chart illustrating a process for detecting head gestures and other data in accordance with an embodiment of this invention.

The modification of a user interface to increase the size of rendered graphical elements of an interaction element within nested interface objects in response to the targeting of the interaction element via a head gesture is illustrated in FIGS. 15A and 15B. In the illustrated embodiment, the user interface includes affordances including actions that can be taken with respect to a set of nested interface objects. Targeting the target zone of any of the interaction elements causes an increase in the size of the affordance. Referring to FIG. 15A, a media player user interface display 350 including nested interface objects is illustrated. The display includes a first scrolling affordance 352 enabling the user to scroll the user interface from the left to the right and a second scrolling affordance 354 enabling the user to scroll the user interface from the right to the left. In other embodiments, the direction of scrolling can be reversed. Nested within the display is a scrollable interface object 356 containing a track list for the media player and the user interface includes a third scrolling affordance 358 enabling the user to scroll down the track list down and a fourth affordance 360 enabling the user to scroll the track list up. In addition to the affordance interaction elements, the user interface includes a cursor 362 indicating the location on the display currently targeted by a staring gesture input provided by a user. Referring to FIG. 15B, a head gesture that targets the third affordance 358 (as indicated by the cursor 362 location) causes the user interface to increase the size of the affordance to facilitate the continued targeting of the affordance.

In the embodiments described above, targeting an affordance for a predetermined period of time initiates an action. In many embodiments, targeting of an interaction element that is an affordance enables the selection of the interaction element in a manner similar to that described above with respect to head gesture reactive interface objects in general. As such, a user can target an affordance with a first head gesture and can initiate an action like scrolling and/or zooming using a second interaction head gesture that need not involve continued staring at the affordance. Examples of head gestures that can be used to select a targeted affordance include (but are not limited to) performing a nodding gesture (moving the head down and up in a particular manner), a shaking gesture (moving the head back and forth), or blinking gesture with the eyes.

Head Tracking and Gesture Identification Process

A process for detecting a head gesture and obtaining distance data in accordance with embodiments of this invention is shown in FIG. 15. The head gesture detection process includes capturing images from two different image capturing devices (1501). A face detection process is then applied to the images from the two image capture devices (1505). A master image face detection process is then applied to the images (1510). In accordance with some embodiments of the invention, the face detection process is performed based upon a Haar-like feature and/or based upon Local Binary Pattern feature matching that can be combined with boosting techniques or other cascade-based classifiers that have previously been trained on a dataset of labeled faces. Based on the results of the face detection processes, the process checks for new faces and resets position and orientation for currently tracked faces (1515). A head gesture process is applied to the images (1520). The head gesture process includes extracting the features of a currently tracked face (1522). In accordance with some embodiments, the feature extraction may be performed using salient-point feature detectors such as, but not limited to, Harris corner detectors and SIFT feature extractors. The extracted features can be tracked by means such as, but not limited to a Kalman-filter, Probabilistic Data Association, or Particle Filter Techniques in accordance with various embodiments. The relative positions of the features of the tracked face compared to the position of the features in previous images are determined (1525). Any features that do not present uniform motion are discarded (1530). The 3D positions of the undiscarded features are then computed for the current images and compared to the positions of previous images (1535). The position and pose of the undiscarded features are then determined and compared to the position and poses in previous images (1540). The results are then smoothed (1545) and provided to the various applications (1550).

Other Features of a Head Gesture Based Interactive System

In accordance with embodiments of this invention, a head gesture based interactive system detects the presence, distance, or orientation (or gaze) of the user face to manage power consumption. If the system detects that the user is not present, not looking at the screen, or is far enough from the screen such that viewing the screen is impossible; and perhaps no other important function is running on the device, the system can be configured to implement a series of automatic actions to begin saving power. For instance, from the feedback to the device power manager, the device may start dimming the screen and/or shutting the screen off in accordance with some embodiments. After perhaps some elapsed time of the user's attention being away from the device, other power management options such as sleep or hibernation modes may become active.

In accordance with some embodiments, the detection software of the head gesture based interactive system detects the user face and blurs the area of the face before the image is displayed, stored or transmitted. This capability allows certain modes of gesture processing or body tracking for gaming and entertainment to be delivered to a user, but at the same time, the information that can be used to identify the user is removed. So, even if the information is compromised, the malicious user may not have access to the identifying information.

In accordance with a number of embodiments, a head gesture based interactive system learns that the device is primarily used by a single user which is a normal usage model for most computers. As soon as the system detects the presence of at least a second face, the system automatically blanks the screen or bring ups a default screen as setup by the original first authorized user. In a number of embodiments, the system is configurable to adjust the display simply based upon the detection of the presence of two or more faces.

In accordance with many embodiments, the head based interactive system allows head gestures to be used as another subtle form of interaction with an electronic device. For instance, the user may use a nodding motion to accept a graphical user interface (GUI) prompt, or shake his/her head to reject it in some embodiments. In a number of embodiments, other modalities can be assigned for user head gestures like nodding once or twice. For instance a continuous head nodding can trigger a signal to the GUI in order to hide certain content for privacy issues.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A method of rendering a user interface on a real-time gesture based interactive system comprising an image capture system including at least two cameras, an image processing system and a display device, the method comprising:
    rendering an initial user interface comprising a set of interface objects using the image processing system, where each interface object comprises:
        a graphical element that is rendered when the interface object is rendered for display;
        a target zone that defines at least one region in the user interface in which a targeting three-dimensional (3D) gesture targets the interface object; and
        a description of a set of permitted interactions;
    displaying the rendered user interface using the display;
    capturing image data using the image capture system;
    detecting an input via a 3D head gesture input modality from the captured image data using the image processing system;
    changing the manner in which the initial user interface is rendered in response to detection of an input via a 3D head gesture input modality using the image processing system;
    displaying the rendered user interface using the display;
    identifying a 3D interaction zone within the captured image data that maps to the user interface;
    determining the location of at least a portion of a human head within the 3D interaction zone from the captured image data;
    identifying a first pose of the at least a portion of a human head within the target zone that corresponds to a targeting 3D head gesture;
    mapping the location of the at least a portion of a human head within the 3D interaction zone to a location within the user interface;

determining that the mapped location within the user interface falls within the target zone of a specific interface object in the user interface;

identifying the specific interface object as a targeted interface object in response to an identification of the first pose as a targeting head gesture and a determination that the mapped location of the at least a portion of the human head falls within the target zone of the specific interface object in the user interface; and changing the rendering of at least the targeted interface object within the user interface in response to the targeting 3D head gesture using the image processing system;

displaying the user interface via the display;

capturing additional image data using the image capture system;

determining that the targeting 3D head gesture targets the targeted interface object for a predetermined period of time, where the determination considers the targeting 3D head gesture to be targeting the targeted interface object during any period of time in which the targeting 3D head gesture does not target the targeted interface object that is less than a hysteresis threshold;

enabling a set of one or more interaction 3D head gestures for the targeted interface object in response to the detection of the targeting 3D head gesture using the image processing system wherein each of the one or more interaction gestures is associated with a permitted interaction in a set of permitted interactions allowed for the targeted interface object and each permitted interaction is an action performed via the user interface to manipulate the targeted interface object;

displaying an interaction element indicating the time remaining to interact with the targeted interface object in response to a determination that the targeting 3D head gesture has targeted the interface object for a predetermined period of time using the image processing system;

tracking the motion of at least a portion of a human head within the 3D interaction zone in additional captured image data captured within a predetermined time period from the detection of the targeting 3D head gesture input using the image processing system;

identifying a change in pose for the at least a portion of a human head within the 3D interaction zone from the first pose to a second pose during the motion of the at least a portion of the human head within the 3D interaction zone during the motion using the image processing system;

determining the motion of the at least a portion of the human head corresponds to a specific interaction 3D head gesture from the set of one or more interaction gestures enabled for the targeted interface object that identifies a specific interaction with the targeted interface object using the image processing system;

verifying that the specific interaction 3D head gesture is associated with a specific interaction within the set of permitted interactions for the interface object using the image processing system;

modifying the user interface in response to the specific interaction with the targeted interface object identified by the specific interaction 3D head gesture using the image processing system;

rendering the modified user interface using the image processing system; and displaying the rendered user interface using the display.

* * * * *